U S010851843B2

United States Patent
Shibata et al.

(10) Patent No.: US 10,851,843 B2
(45) Date of Patent: Dec. 1, 2020

(54) VEHICLE INCLUDING COUPLING DEVICE

(71) Applicant: TOYOTA JIDOSHA KABUSHIKI KAISHA, Toyota (JP)

(72) Inventors: Shinichiro Shibata, Toyota (JP); Masayuki Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 16/377,443

(22) Filed: Apr. 8, 2019

(65) Prior Publication Data

US 2019/0309804 A1   Oct. 10, 2019

(30) Foreign Application Priority Data

Apr. 6, 2018 (JP) ................. 2018-074248

(51) Int. Cl.
| | |
|---|---|
| *F16H 48/24* | (2006.01) |
| *F16D 11/12* | (2006.01) |
| *F16H 48/30* | (2012.01) |
| *F16H 48/295* | (2012.01) |
| *B60T 17/08* | (2006.01) |
| *B60T 8/44* | (2006.01) |
| *F16H 48/38* | (2012.01) |
| *F16D 23/06* | (2006.01) |
| *F16D 23/12* | (2006.01) |

(52) U.S. Cl.
CPC ............. *F16D 11/12* (2013.01); *B60T 8/44* (2013.01); *B60T 17/085* (2013.01); *F16H 48/24* (2013.01); *F16H 48/295* (2013.01); *F16H 48/30* (2013.01); *F16H 48/38* (2013.01); *F16D 2023/0625* (2013.01); *F16D 2023/123* (2013.01)

(58) Field of Classification Search
None
See application file for complete search history.

(56) References Cited

U.S. PATENT DOCUMENTS

| | | | | |
|---|---|---|---|---|
| 3,467,212 A | * | 9/1969 | Doll ........................ | F16H 48/30 180/6.2 |
| 3,642,103 A | * | 2/1972 | Schott ..................... | B60T 1/005 192/221 |
| 2003/0162622 A1 | * | 8/2003 | Fusegi ................... | B60K 23/04 475/231 |

(Continued)

FOREIGN PATENT DOCUMENTS

| | | |
|---|---|---|
| JP | 2006-052860 A | 2/2006 |
| JP | 2010-112491 A | 5/2010 |

*Primary Examiner* — Justin Holmes
(74) *Attorney, Agent, or Firm* — Oliff PLC

(57) ABSTRACT

A vehicle including a coupling device that includes (a) an engagement clutch mechanism for coupling an input side engagement member that is coupled to a drive power source of the vehicle and an output side engagement member that is coupled to a drive wheel of the vehicle; and (b) a cam mechanism for assisting engagement of the input and output side engagement members depending on a differential torque by which the input and output side engagement members are rotated differentially. The vehicle includes a control device configured, when the engagement of the input and output side engagement members is to be released, to cause a braking force to be applied to one of the input and output side engagement members such that the differential torque is reduced.

15 Claims, 13 Drawing Sheets

(56) References Cited

U.S. PATENT DOCUMENTS

| | | | | |
|---|---|---|---|---|
| 2004/0166985 | A1* | 8/2004 | Sudou | F16H 48/30 475/230 |
| 2006/0046888 | A1* | 3/2006 | Puiu | B60K 17/16 475/151 |
| 2007/0197338 | A1* | 8/2007 | Fusegi | F16H 48/30 475/231 |
| 2010/0056314 | A1* | 3/2010 | Maruyama | F16H 48/24 475/150 |
| 2010/0179736 | A1* | 7/2010 | Johnson | F16H 48/30 701/51 |
| 2011/0105264 | A1* | 5/2011 | Maruyama | F16H 48/30 475/150 |
| 2014/0324290 | A1* | 10/2014 | Dornhege | B60W 30/18172 701/41 |

* cited by examiner

US 10,851,843 B2

VEHICLE INCLUDING COUPLING DEVICE

This application claims priority from Japanese Patent Application No. 2018-074248 filed on Apr. 6, 2018, the disclosure of which is herein incorporated by reference in its entirety.

FIELD OF THE ART

The present invention relates to a technology in which while suppressing increases in the size and mass of a coupling device in a vehicle, it is possible to suitably reduce a time required to release an engagement of an input side engagement member and an output side engagement member, namely, a time required to release a coupled state in which the input side engagement member and the output side engagement member engage with each other.

BACKGROUND ART

There is known a coupling device for a vehicle, which includes (a) an engagement clutch mechanism configured to couple an input side engagement member that is coupled to a drive power source in a power transmittable manner and an output side engagement member that is coupled to a drive wheel in a power transmittable manner such that the input side engagement member and the output side engagement member engage with each other; and (b) a cam mechanism configured to assist the engagement of the input side engagement member and the output side engagement member depending on a differential torque by which the input side engagement member and the output side engagement member are rotated differentially in a coupled state in which the input side engagement member and the output side engagement member are coupled to each other in the engagement clutch mechanism. An example of such a coupling device for a vehicle is described in patent document 1.

In the coupling device of patent document 1, the locking member and the locked member of an engagement clutch mechanism are engaged with each other, and thus in a differential device, a differential case and one of a pair of side gears are coupled to each other in a power transmittable manner, so that a non-differential state in which the differential motion of the pair of side gears is restricted, that is, a differential lock state is established in patent document 1, when in a coupled state in which the locking member and the locked member are engaged so as to couple the locking member and the locked member, that is, in the differential lock state, for example, a differential torque, by which the locking member and the locked member are rotated differentially, is generated by the differential rotation of the pair of side gears caused by turn traveling, etc., the locking member is pressed onto the locked member, by a cam mechanism depending on the differential torque, in a direction that causes the locking member to engage with the locked member, and thus the engagement of the locking member and the locked member is assisted. For example, the coupling device of patent document 1 includes: an actuator configured to move the locking member to an engagement position in which the locking member engages with the locked member or a nonengagement position in which the locking member does not engage with the locked member; and a coil-shaped return spring which constantly forces the locking member in a direction toward the nonengagement position away from the engagement position. The actuator moves the locking member to the engagement position against the biasing force of the return spring, and moves the locking member to the nonengagement position by the biasing force of the return spring.

PRIOR ART DOCUMENT

Patent Document

[PATENT DOCUMENT 1] Japan Patent Application Publication JP-2006-52860A

SUMMARY OF THE INVENTION

Incidentally, in a case where in the coupling device of a vehicle in patent document 1, for example, the engagement of the locking member and the locked member is to be released by the biasing force of the return spring, when the locking member is pressed onto the locked member by the cam mechanism toward the direction that causes the locking member to engage with the locked member, that is, when the differential torque is generated, it is difficult for the locking member to be moved from the engagement position to the nonengagement position. Hence, for example, there is a possibility that the locking member is not moved from the engagement position to the nonengagement position until a vehicle traveling state is brought into a traveling state where the differential torque is low, and thus a relatively long time may be required after the engagement of the locking member and the locked member is attempted to be released in the engagement clutch mechanism until the engagement of the locking member and the locked member is actually released. It is considered that in order to cope with this problem, the biasing force of the return spring may be increased such that the locking member could be switched from the engagement position to the nonengagement position even in a state in which the locking member is pressed onto the locked member by the cam mechanism toward the direction that causes the locking member to engage with the locked member. However, when in order to couple the locking member and the locked member, the locking member is moved to the engagement position against the biasing force of the return spring, a force applied from the actuator to the locking member would need to be increased as the biasing force of the return spring is increased, so that the size and mass of the actuator, that is, the coupling device could be disadvantageously increased.

The present invention is made in view of the foregoing conditions, and an object thereof is to provide a vehicle including a coupling device in which while suppressing increases in the size and mass thereof, it is possible to suitably reduce a time required to release an engagement of an input side engagement member and an output side engagement member, namely, a time required to release a coupled state in which the input side engagement member and the output side engagement member engage with each other.

According to the present invention, there is provided a vehicle comprising a coupling device, wherein the coupling device includes: an engagement clutch mechanism configured to couple an input side engagement member that is coupled to a drive power source in a power transmittable manner and an output side engagement member that is coupled to a drive wheel in a power transmittable manner such that the input side engagement member and the output side engagement member engage with each other; and a cam mechanism configured to assist the engagement of the input side engagement member and the output side engagement member depending on a differential torque by which the input side engagement member and the output side engagement member are rotated differentially in a coupled state in which the input side engagement member and the output side engagement member are coupled to each other in the engagement clutch mechanism. The vehicle comprises a control device configured, when the engagement of the input side engagement member and the output side engagement member is to be released, to cause a braking force to be applied to one of the input side engagement member and the output side engagement member such that the differential torque is reduced In the present invention, when the coupled state is to be released in the engagement clutch mechanism, namely, when the engagement of the input side engagement member and the output side engagement member is to be released, the braking force is applied to one of the input side engagement member and the output side engagement member such that the differential torque is reduced. Thus, when the engagement of the input side engagement member and the output side engagement member is to be released, the differential torque is reduced by the application of the braking force. Owing to this arrangement, it is possible to advantageously reduce a time required to release the engagement of the input side engagement member and the output side engagement member, thereby eliminating needs of increase of the biasing force of the return spring and increase of a size of the actuator, for example, which have been required conventionally. Therefore, it is possible to advantageously reduce the time required to release the coupled state in the engagement clutch mechanism, namely, to release the engagement of the input side engagement member and the output side engagement member, while suppressing increases in the size and mass of the coupling device.

DESCRIPTION OF PREFERRED EMBODIMENTS

Figure 1:
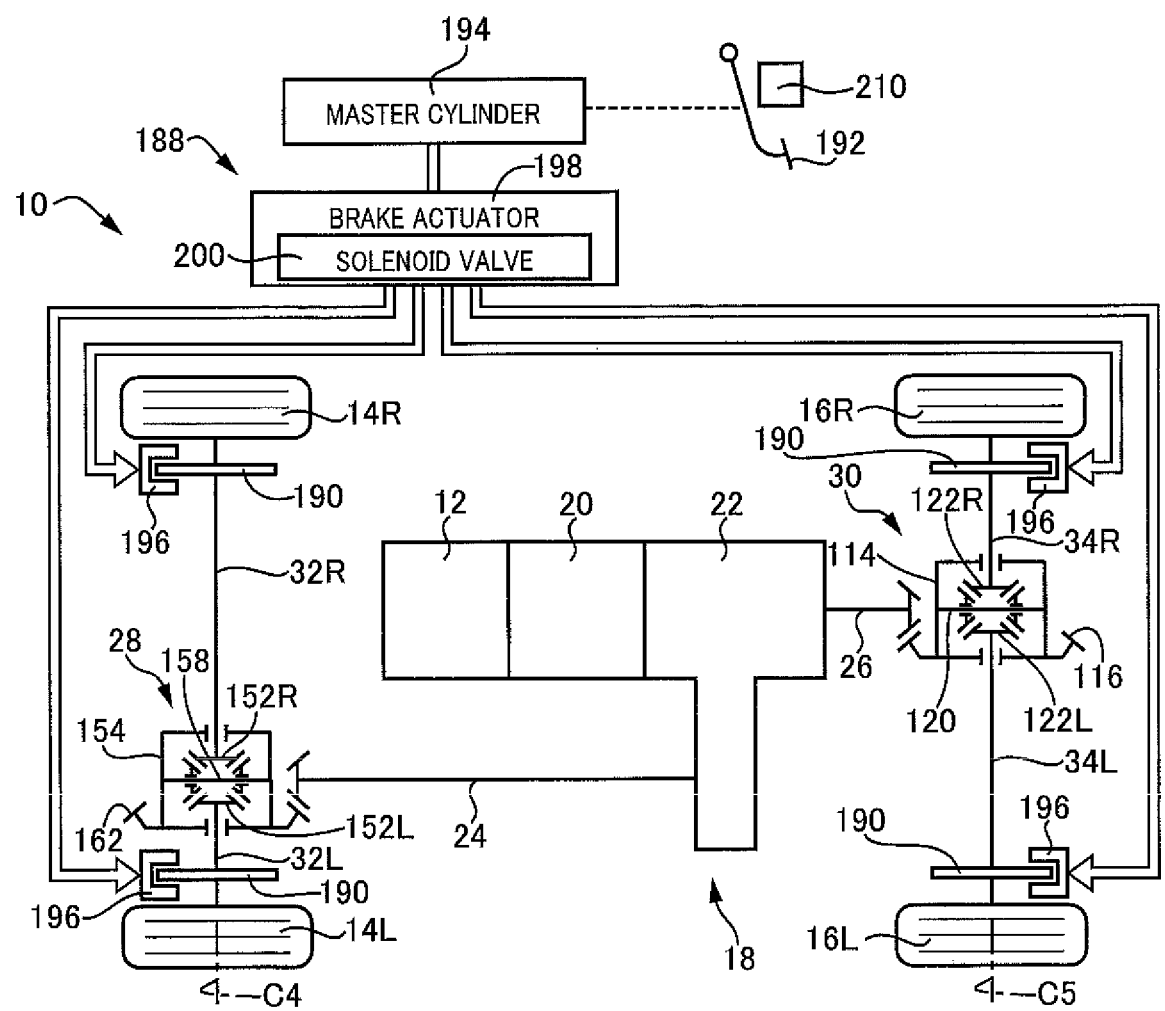
FIG. 1 is a view illustrating a schematic configuration of a four-wheel drive vehicle to which the present invention is applied.

According to an embodiment of the invention, the vehicle comprises a first differential device including a first differential case which is supported to be rotatable about a first rotation axis line, wherein the input side engagement member is a first movable sleeve which is supported by the first differential case, such that the first movable sleeve is substantially unrotatable about the first rotation axis relative to the first differential case, and movable in a direction of the first rotation axis line relative to the first differential case, the output side engagement member is one of a pair of first side gears which are held in the first differential case and are rotatable about the first rotation axis line, the engagement clutch mechanism includes: first output side engagement teeth which are formed in a back surface of the one of the pair of first side gears; first input side engagement teeth which are formed in the first movable sleeve and are to engage with the first output side engagement teeth; and a first actuator which is configured to move the first movable sleeve to a first engagement position in which the first input side engagement teeth engage with the first output side engagement teeth or a first nonengagement position in which the first input side engagement teeth do not engage with the first output side engagement teeth, when the first movable sleeve is moved to the first engagement position by the first actuator, the first differential case and the one of the pair of first side gears are coupled to each other, and when the first movable sleeve is moved by the first actuator from the first engagement position to the first nonengagement position, a coupling of the first differential case and the one of the pair of first side gears is released. Thus, while suppressing increase of the size of the first actuator, it is possible to reduce a time required to release a differential lock state of the first differential device in which the first differential case and the above-described one of the pair of first side gears are coupled to each other whereby the pair of first side gears are to be rotated integrally with each other.

According to an embodiment of the invention, the cam mechanism includes cam surfaces provided on opposed surfaces of the first differential case and the first movable sleeve, which are opposed to each other in a circumferential direction about the first rotation axis line, such that the first movable sleeve is pressed against the back surface of the one of the first side gears, by a pressing force that is increased depending on the differential torque. Thus, the pressing force is reduced with the differential torque being reduced by application of the braking force to the one of the input side engagement member and the output side engagement member, so that it is possible to advantageously reduce a force required by the first actuator to move the first movable sleeve from the first engagement position to the first nonengagement position.

According to an embodiment of the invention, the first actuator includes a first return spring which constantly forces the first movable sleeve in a direction toward the first nonengagement position away from the first engagement position, and the first actuator is configured to move the first movable sleeve to the first engagement position against a biasing force of the first return spring, and moves the first movable sleeve to the first nonengagement position by the biasing force of the first return spring. Thus, owing to the reduction of the pressing force by the reduction of the differential torque, it is possible to reduce the biasing force of the first return spring and accordingly to advantageously reduce the size of the first actuator.

According to an embodiment of the invention, a left side drive wheel and a right side drive wheel which are a pair of left and right drive wheels are coupled to the pair of first side gears a power transmittable manner, and when the first movable sleeve is to be moved by the first actuator from the first engagement position to the first nonengagement position so as to release the coupling of the first differential case and the one of the pair of first side gears, the control device is configured to cause the braking force to be applied to one of the left side drive wheel and the right side drive wheel, a rotation speed of the one of the left side drive wheel and the right side drive wheel being higher than a rotation speed of the other of the left side drive wheel and the right side drive wheel. Thus, by applying the braking force to the one of the left side drive wheel and the right side drive wheel, the rotation speed of which is higher than the rotation speed of the other, it is possible to cause the first differential case and the one of the pair of first side gears to be rotated integrally with each other, namely, cause the input side engagement member and the output side engagement member to be rotated integrally with each other, so that the differential torque can be advantageously reduced.

According to an embodiment of the invention, the vehicle comprises: a second differential device including: a second differential case which stores a pair of second side gears and which is supported to be rotatable about a second rotation axis line; a second pinion engaging with the pair of second side gears; and an annular pinion support member which is stored within the second differential case and is rotatable about the second rotation axis line relative to the second differential case, the annular pinion support member supporting the second pinion through a second pinion shaft, such that the second pinion is rotatable, wherein the input side engagement member is a second movable sleeve which is supported by the second differential case, such that the second movable member is substantially unrotatable about the second rotation axis relative to the second differential case, and which is movable in a direction of the second rotation axis line relative to the second differential case, the output side engagement member is the annular pinion support member which is provided in the second differential device, the engagement clutch mechanism includes: second output side engagement teeth which are formed in one of axially opposite end surfaces of the annular pinion support member, the one of the axially opposite end surfaces being closer to the second movable sleeve than the other of the axially opposite end surfaces; second input side engagement teeth which are formed in the second movable sleeve and are to engage with the second output side engagement teeth; and a second actuator which is configured to move the second movable sleeve to a second engagement position in which the second input side engagement teeth engage with the second output side engagement teeth or a second nonengagement position in which the second input side engagement teeth do not engage with the second output side engagement teeth, when the second movable sleeve is moved to the second engagement position by the second actuator, the second differential case and the annular pinion support member are coupled to each other, and when the second movable sleeve is moved by the second actuator from the second engagement position to the second nonengagement position, a coupling of the second differential case and the annular pinion support member is released. Owing to the above arrangement, it is possible to advantageously reduce the time required to switch from a connected state of the second differential device in which a power transmission path between the second differential case and the pair of second side gears is connected, to a disconnected state of the second differential device in which the power transmission path is disconnected, while suppressing increase in the size of the second actuator.

According to an embodiment of the invention, the cam mechanism includes cam surfaces provided on opposed surfaces of the second differential case and the second movable sleeve, which are opposed to each other in a circumferential direction about the second rotation axis line, such that the second movable sleeve is pressed against the one of the axially opposite end surfaces of the annular pinion support member, by a pressing force that is increased depending on the differential torque. Thus, the pressing force is reduced with the differential torque being reduced by application of the braking force to the one of the input side engagement member and the output side engagement member, so that it is possible to advantageously reduce a force required by the second actuator to move the second movable sleeve from the second engagement position to the second nonengagement position.

According to an embodiment of the invention, the second actuator includes a second return spring which constantly forces the second movable sleeve in a direction toward the second nonengagement position away from the second engagement position, and the second actuator is configured to move the second movable sleeve to the second engagement position against a biasing force of the second return spring, and moves the second movable sleeve to the second nonengagement position by the biasing force of the second return spring. Thus, owing to the reduction of the pressing force by the reduction of the differential torque, it is possible to reduce the biasing force of the second return spring and accordingly to advantageously reduce the size of the second actuator.

According to an embodiment of the invention, a pair of left and right front wheel side drive wheels are coupled to the pair of second side gears in a power transmittable manner, a pair of left and right rear wheel side drive wheels are coupled to the second differential case through a differential device in a power transmittable manner, and when the second movable sleeve is to be moved by the second actuator from the second engagement position to the second nonengagement position so as to release the coupling of the second differential case and the pinion support member, the control device is configured to cause the braking force to be applied to one of the pair of left and right front wheel side drive wheels and the pair of left and right rear wheel side drive wheels, an average rotation speed of the one of the pair of left and right front wheel side drive wheels and the pair of left and right rear wheel side drive wheels is higher than the other of the pair of left and right front wheel side drive wheels and the pair of left and right rear wheel side drive wheels. Thus, by applying the braking force to the one of the pair of left and right front wheel side drive wheels and the pair of left and right rear wheel side drive wheels, the average rotation speed of which is higher than the average rotation speed of the other, it is possible to cause the second differential case and the pinion support member to be rotated integrally with each other, namely, cause the input side engagement member and the output side engagement member to be rotated integrally with each other, so that the differential torque can be advantageously reduced.

Examples of the present invention will be described in detail below with reference to drawings. In the examples below, the drawings are simplified or changed in shape as necessary, and thus the dimensional ratios, the shapes, etc., of individual portions are not necessarily drawn accurately.

Example 1

FIG. 1 is a diagram illustrating a schematic configuration of a four-wheel drive vehicle (vehicle) 10 to which the present invention is applied. As shown in FIG. 1, the four-wheel drive vehicle 10 includes an engine 12 which serves as a drive power source, a pair of left and right front wheels (front wheel side drive wheels) 14L, 14R, a pair of left and right rear wheels (rear wheel side drive wheels) 16L, 16R, a power transmission device 18 which transmits drive power from the engine 12 both to the front wheels 14L, 14R and to the rear wheels 16L, 16R and the like. The rear wheels 16L, 16R are main drive wheels which serve as drive wheels both during two-wheel drive (2WD) traveling and during four-wheel drive (4WD) traveling. The front wheels 14L, 14R are auxiliary drive wheels which serve as driven wheels during the 2WD traveling and which serve as drive wheels during the 4WD traveling. The four-wheel drive vehicle 10 is a four-wheel drive vehicle based on front engine/rear wheel drive (FR).

The power transmission device 18 includes: an automatic transmission 20 which is coupled to the engine 12 in a power transmittable manner; a transfer 22 serving as a front and rear wheel power distribution device which is coupled to the automatic transmission 20 in a power transmittable manner; a front propeller shaft 24 and a rear propeller shaft 26 which are individually coupled to the transfer 22; a front wheel differential gear device (second differential device) 28 which is coupled to the front propeller shaft 24 in a power transmittable manner; a rear wheel differential gear device (first differential device) 30 which is coupled to the rear propeller shaft 26 in a power transmittable manner; left and right front wheel axles 32L and 32R which are coupled to the front wheel differential gear device 28 in a power transmittable manner; left and right rear wheel axles 34L and 34R which are coupled to the rear wheel differential gear device 30 in a power transmittable manner; and the like. In the power transmission device 18 configured as described above, the drive power from the engine 12 transmitted through the automatic transmission 20 to the transfer is transmitted to the rear wheels 16L, 16R, for example, sequentially through a power transmission path on the side of the rear wheels 16L, 16R such as the rear propeller shaft 26, the rear wheel differential gear device 30 and the rear wheel axles 34L and 34R. When in the transfer 22, a part of the drive power from the engine 12 is distributed to the side of the front wheels 14L,14R, the distributed part of the drive power is transmitted to the front wheels 14L,14R, for example, sequentially through a power transmission path on the side of the front wheels 14L, 14R such as the front propeller shaft 24, the front wheel differential gear device 28 and the front wheel axles 32L and 32R.

Figure 2:
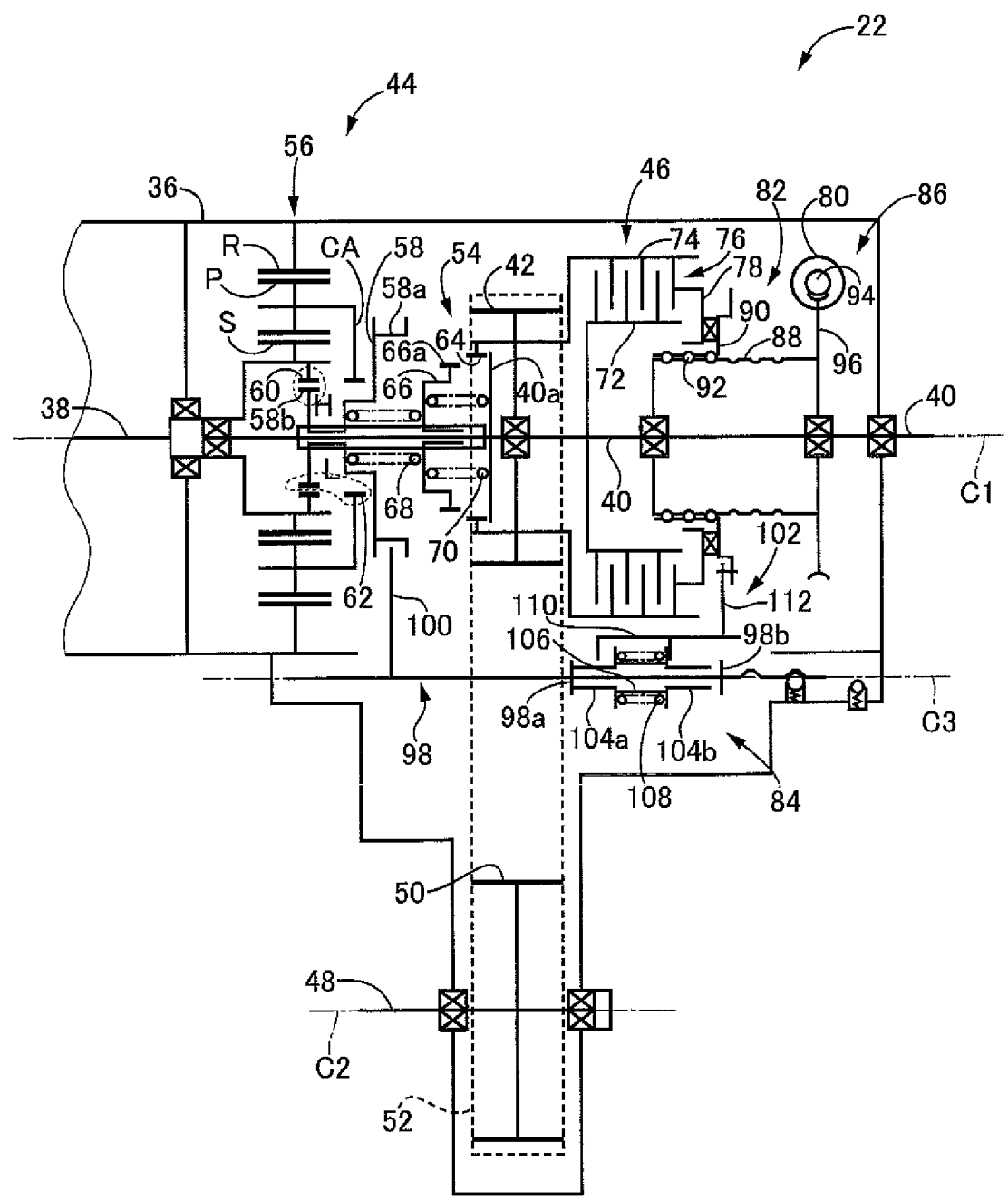
FIG. 2 is a view illustrating a schematic configuration of the transfer provided in the four-wheel drive vehicle of FIG. 1.

FIG. 2 is a skeleton diagram illustrating a schematic configuration of the transfer 22. As shown in FIG. 2, the transfer 22 includes a transfer case 36 which serves as a non-rotating member. The transfer 22 includes, within the transfer case 36, about a common first rotation axis C1: an input shaft 38 which is coupled to the automatic transmission 20 in a power transmittable manner; a rear wheel side output shaft 40 which is coupled to the rear propeller shaft 26 in a power transmittable manner and which outputs the drive power from the engine 12 to the rear wheels 16L, 16R; a drive gear 42 which is supported by the rear wheel side output shaft 40 and rotatable relative to the rear wheel side output shaft 40 and which outputs the drive power from the engine 12 to the front wheels 14L, 14R; a high-low switching mechanism 44 serving as an auxiliary transmission which changes a speed of the rotation of the input shaft 38 and which transmits the rotation to the rear wheel side output shaft 40; and a front wheel drive clutch 46 serving as a multi-plate clutch which adjusts a transmission torque that is transmitted from the rear wheel side output shaft 40 to the drive gear 42. The transfer 22 also includes, within the transfer case 36, about a common second rotation axis C2: a front wheel side output shaft 48 which is coupled to the front propeller shaft 24 in a power transmittable manner; and a driven gear 50 which is fixed to the front wheel side output shaft 48. The transfer 22 also includes, within the transfer case 36, a front wheel drive chain 52 which connects between the drive gear 42 and the driven gear 50, and a center differential lock mechanism 54 serving as a dog clutch which integrally couples the rear wheel side output shaft 40 and the drive gear 42.

For example, the transfer 22 configured as described above adjusts torque transmitted to the drive gear 42 so as to transmit the drive power transmitted from the automatic transmission 20 to only the rear wheels 16L, 16R or to distribute it both to the front wheels 14L, 14R and to the rear wheels 16L, 16R. For example, the transfer 22 switches between a differential state where a rotational differential between the rear propeller shaft 26 and the front propeller shaft 24 is not restricted and a non-differential state where the rotational differential therebetween is restricted, that is, a so-called center differential lock state. For example, the transfer 22 establishes any one of a high speed side gear stage H and a low speed side gear stage L so as to change a speed of the rotation transmitted from the automatic transmission 20 and to transmit the rotation to the rear wheel side output shaft 40. In other words, in the transfer 20, the rotation of the input shaft 38 is transmitted through the high-low switching mechanism 44 to the rear wheel side output shaft 40, and the transmission of power from the rear wheel side output shaft 40 to the drive gear 42 is not performed in a state in which the torque transmitted through the front wheel drive clutch 46 from the rear wheel side output shaft 40 to the drive gear 42 is set to zero and the center differential lock mechanism 54 is released. On the other hand, the transfer 20 transmits the rotation of the input shaft 38 through the high-low switching mechanism 44 to the rear wheel side output shaft 40, and the transmission of power from the rear wheel side output shaft 40 to the drive gear 42, that is, the transmission of power from the rear wheel side output shaft 40 through the drive gear 42, front wheel drive chain 52 and driven gear 50 to the front wheel side output shaft 48 is allowed in a state in which the torque is transmitted through the front wheel drive clutch 46 from the rear wheel side output shaft 40 to the drive gear 42, or the center differential lock mechanism 54 is engaged.

As shown in FIG. 2, the high-low switching mechanism 44 includes a single pinion-type planetary gear device 56 and a high-low sleeve 58. The planetary gear device 56 includes: a sun gear S which is coupled to the input shaft 38 and is unrotatable relative to the input shaft 38; a ring gear R which is coupled to the transfer case 36 and is unrotatable relative to the transfer case 36 about the first rotation axis C1; and a carrier CA which supports a plurality of pinion gears P engaging with the sun gear S and the ring gear R such that the pinion gears P can be rotated on their axes and can be rotated about the first rotation axis C1. Hence, in the high-low switching mechanism 44, the rotation speed of the sun gear S is equal to that of the input shaft 38, and the rotation speed of the carrier CA is made lower than that of the input shaft 38. As shown in FIG. 2, in the inner circumferential surface of the sun gear S, high side gear teeth 60 are provided so as to be fixed to the inner circumferential surface of the sun gear S, and in the carrier CA, low side gear teeth 62 which define a diameter equal to a diameter defined by the high side gear teeth 60 are provided so as to be fixed to the carrier CA.

The high side gear teeth 60 are spline teeth which output the rotation whose speed is equal to that of the input shaft 38 to the rear wheel side output shaft 40 and which involve the establishment of the high speed side gear stage H. The low side gear teeth 62 are spline teeth which output the rotation whose speed is lower than that of the high side gear teeth 60 to the rear wheel side output shaft 40 and which involve the establishment of the low speed side gear stage L. The high-low sleeve 58 is spline fitted to the rear wheel side output shaft 40 and is movable relative to the rear wheel side output shaft 40 in the direction of the first rotation axis C1. The high-low sleeve 58 includes a fork coupling portion 58a and outer circumferential teeth 58b which are integrally provided adjacently to the fork coupling portion 58a. When the high-low sleeve 58 is moved in the direction of the first rotation axis C1 relative to the rear wheel side output shaft 40, the outer circumferential teeth 58b included in the high-low sleeve 58 engage with the high side gear teeth 60 or the low side gear teeth 62. The outer circumferential teeth 58b included in the high-low sleeve 58 engage with the high side gear teeth 60, and thus the rotation whose speed is equal to that of the rotation of the input shaft 38 is transmitted to the rear wheel side output shaft 40. The outer circumferential teeth 58b included in the high-low sleeve 58 engage with the low side gear teeth 62, and thus the rotation whose speed is made lower than that of the rotation of the input shaft 38 is transmitted to the rear wheel side output shaft 40. Hence, the high side gear teeth 60 and the high-low sleeve 58 cooperate to function as a high speed side gear stage clutch which establishes the high speed side gear stage H, and the low side gear teeth 62 and the high-low sleeve 58 cooperate to function as a low speed side gear stage clutch which establishes the low speed side gear stage L.

As shown in FIG. 2, the center differential lock mechanism 54 includes: lock teeth 64 which are provided so as to be fixed to the inner circumferential surface of the drive gear 42; and a lock sleeve 66 which is spline fitted to the rear wheel side output shaft 40 and is movable in the direction of the first rotation axis C1 relative to the rear wheel side output shaft 40. In the lock sleeve 66, outer circumferential teeth 66a are formed, and when the lock sleeve 66 is moved in the direction of the first rotation axis C1 relative to the rear wheel side output shaft 40, the outer circumferential teeth 66a formed in the lock sleeve 66 mesh with the lock teeth 64. In the transfer 22, when the center differential lock mechanism 54 is brought into a engaged state in which the outer circumferential teeth 66a of the lock sleeve 66 and the lock tenth engage with each other, the rear wheel side output shaft 40 and the drive gear 42 are rotated together with each other so as to establish the center differential lock state.

As shown in FIG. 2, the transfer 22 includes a coil-shaped first spring 68 between the high-low sleeve 58 and the lock sleeve 66. The first spring 68 makes contact with the high-low sleeve 58 and the lock sleeve 66 so as to bias or constantly forces each of the high-low sleeve 58 and the lock sleeve 66 in a direction away from the other of the high-low sleeve 58 and the lock sleeve 66. The transfer 22 also includes a coil-shaped second spring 70 between the drive gear 42 and the lock sleeve 66. The second spring 70 makes contact with a convex portion 40a which is formed in the rear wheel side output shaft 40 and the lock sleeve 66, so as to bias or constantly force the lock sleeve 66 in a direction away from the lock teeth 64. The outer circumferential teeth 58b of the high-low sleeve 58 are moved in a direction away from the lock sleeve 66, so as to mesh with the high side gear teeth 60, and the outer circumferential teeth 58b are moved in a direction toward the lock sleeve 66, so as to mesh with the low side gear teeth 62. The outer circumferential teeth 66a of the lock sleeve 66 are moved in a direction toward the drive gear 42, so as to engage with the lock teeth 64. In other words, the outer circumferential teeth 66a of the lock sleeve 66 engage with the lock teeth 64 when the outer circumferential teeth 58b of the high-low sleeve 58 mesh with the low side gear teeth 62.

The front wheel drive clutch 46 is a multi-plate friction clutch. As shown in FIG. 2, the front wheel drive clutch 46 includes; a clutch hub 72 which is coupled to the rear wheel side output shaft 40 and is unrotatable relative to the rear wheel side output shaft 40; a clutch drum 74 which is coupled to the drive gear 42 and is unrotatable relative to the drive gear 42; a friction engagement element 76 which is inserted between the clutch hub 72 and the clutch drum 74 and which selectively disconnects or connects a power transmission path between the clutch hub 72 and the clutch drum 74; and a piston 78 which presses the friction engagement element 76. The front wheel drive clutch 46 is brought into a released state when the piston 78 is moved to a non-pressed side on which the piston 78 is separated from the drive gear 42 in the direction of the first rotation axis C1 so as not to make contact the friction engagement element 76. On the other hand, in the front wheel drive clutch 46, a transmission torque between the clutch hub 72 and the clutch drum 74 is adjusted by the amount of movement of the piston 78 when the piston 78 is moved to a pressing side on which the piston 78 is moved close to the drive gear 42 in the direction of the first rotation axis C1 so as to make contact with the friction engagement element 76. Hence, the front wheel drive clutch 46 is selectively brought by the amount of movement of the piston 78 into any one of the released state, a slip state and an engaged state.

When the front wheel drive clutch 46 is in the released state and the center differential lock mechanism 54 is in the released state without the outer circumferential teeth 66a of the lock sleeve 66 and the lock teeth 64 engaging with each other, since a power transmission path between the rear wheel side output shaft 40 and the drive gear 42 is disconnected, the transfer 22 transmits the drive power transmitted from the engine 12 through the automatic transmission 20 to only the rear wheels 16L, 16R, that is, the rear propeller shaft 26. When the front wheel drive clutch 46 is in the slip state or the engaged state, since the power transmission path between the rear wheel side output shaft 40 and the drive gear 42 is connected, the transfer 22 distributes the drive power transmitted from the engine 12 through the automatic transmission 20 to the front wheels 14L, 14R and the rear wheels 16L, 16R, that is, the front propeller shaft 24 and the rear propeller shaft 26.

As shown in FIG. 2, the transfer 22 includes, as a device for operating the high-low switching mechanism 44, the front wheel drive clutch 46 and the center differential lock mechanism 54: an electric motor 80; a screw mechanism 82 which converts the rotating motion of the motor shaft of the electric motor 80 into the linear motion of a nut member 90; and a transmission mechanism 84 which transmits a force of the linear motion of the nut member 90 in the screw mechanism 82 to the high-low switching mechanism 44, front wheel drive clutch 46 and center differential lock mechanism 54.

The screw mechanism 82 is arranged on the first rotation axis C1 which is concentric with the rear wheel side output shaft 40. The screw mechanism 82 includes: a screw shaft member 88 serving as a rotation member which is indirectly coupled to the electric motor 80 through a worm gear 86; and the nut member 90 serving as a linear motion member which is screwed on the screw shaft member 88 so as to be movable in the direction of the first rotation axis C1 relative to the screw shaft member 88 as the screw shaft member 88 is rotated. The screw mechanism 82 is a ball screw in which the screw shaft member 88 and the nut member 90 are in thread engagement with each other with a plurality of balls 92 being interposed therebetween. The worm gear 86 is a gear pair that includes: a worm 94 which is integrally formed with the motor shaft of the electric motor 80; and a worm wheel 96 which is integrally formed with the screw shaft member 88. The screw mechanism 82 is configured as described above, and thus the screw mechanism 82 converts the rotation transmitted from the electric motor 80 through the worm gear 86 to the screw shaft member 88 into the linear motion of the nut member 90 in the direction of the first rotation axis C1.

As shown in FIG. 2, the transmission mechanism 84 is provided on a third rotation axis C3 parallel to the first rotation axis C1, and includes: a fork shaft 98 which is coupled to the nut member 90 in a power transmittable manner; and a fork 100 which is provided to be fixed to the fork shaft 98 and which is coupled to the fork coupling portion 58a of the high-low sleeve 58. Hence, the transmission mechanism 84 transmits the force of the linear motion of the nut member 90 in the screw mechanism 82 through the fork shaft 98 and the fork 100 to the high-low sleeve 58 of the high-low switching mechanism 44. As described previously, the first spring 68 is provided between the high-low sleeve 58 and the lock sleeve 66, and the second spring 70 is provided between the lock sleeve and the drive gear 42. Owing to this arrangement, the transmission mechanism 84 transmits the force of the linear motion of the nut member 90 to the high-low sleeve 58, and also transmits it to the lock sleeve 66 of the center differential lock mechanism 54 through the first spring 68 and the second spring 70.

As shown in FIG. 2, the piston 78 of the front wheel drive clutch 46 is coupled to the nut member 90 such that the piston 78 is rotatable about the first rotation axis C1 relative to the nut member 90 of the screw mechanism 82 and is unmovable in the direction of the first rotation axis C1 relative to the nut member 90. Owing to this arrangement, the force of the linear motion of the nut member 90 is transmitted through the piston 78 to the friction engagement element 76 of the front wheel drive clutch 46. The piston 78 is a pressing member which is coupled to the nut member 90 and which presses the friction engagement element 76 of the front wheel drive clutch 46, and functions as a member which constitutes a part of the transmission mechanism 84.

The transmission mechanism 84 includes a coupling mechanism 102 which couples the nut member 90 and the fork shaft 98. The coupling mechanism 102 is arranged on the third rotation axis C3 so as to be slidable relative to the fork shaft 98, and includes: two flanged cylindrical members 104a,104b having respective flanges which are provided in their respective end portions and which are opposed to each other in the direction of the third rotation axis C3; a cylindrical spacer 106 which is interposed between the two flanged cylindrical members 104a,104b; a coil-shaped third spring 108 which is disposed on the outer circumferential side of the spacer 106; a grasping member 110 which grasps the flanges of the respective two flanged cylindrical members 104a,104b that are slidable in the direction of the third rotation axis C3; and a connecting member 112 which connects the grasping member 110 and the nut member 90. A distance between the flanges of the respective flanged cylindrical members 104, 104b in a state in which the flanges make contact with the grasping member 110 is set longer than the length of the spacer 106, and by the biasing force of the third spring 108 compressed by the flanges of the respective flanged cylindrical members 104a,104b, the flanges of the respective flanged cylindrical members 104a, 104b are biased so as to make contact with the grasping member 110. The fork shaft 98 is provided with stoppers 98a,98b which inhibits the flanged cylindrical members 104a,104b from sliding on the fork shaft 98 in the direction of the third rotation axis C3. The stoppers 98a, 98b inhibits the flanged cylindrical members 104a,104b from sliding on the fork shaft 98 in the direction of the third rotation axis C3, and thus the transmission mechanism 84 can transmit the force of the linear motion of the nut member 90 through the coupling mechanism 102, fork shaft 98 and fork 100 to the high-low switching mechanism 44.

The outer circumferential teeth 66a of the lock sleeve 66 are brought into meshing engagement with the lock teeth 64 when the fork shaft 98 is moved to a low gear position, i.e., a position in which the fork shaft 98 makes the outer circumferential teeth 58b of the high-low sleeve 58 mesh with the low side gear teeth 62. The friction engagement element 76 of the front wheel drive clutch 46 is pressed by the piston 78 when the fork shaft 98 is moved to a high gear position, i.e., a position in which the fork shaft 98 makes the outer circumferential teeth 58b of the high-low sleeve 58 mesh with the high side gear teeth 60, and the friction engagement element 76 is not pressed by the piston 78 when the fork shaft 98 is moved to the above-described low gear position. When the fork shaft 98 is positioned in the high gear position, in the coupling mechanism 102, the distance between the flanges of the respective flanged cylindrical members 104a,104b can be changed between the distance in a state where the flanges make contact with the grasping member 110 and the length of the spacer 106. Owing to this arrangement, the coupling mechanism 102 allows the movement of the nut member 90 the direction of the first rotation axis between the position in which the friction engagement element 76 of the front wheel drive clutch 46 is pressed by the piston 78 and the position in which the friction engagement element 76 is not pressed, while the fork shaft 98 is held in the high gear position.

Figure 3:
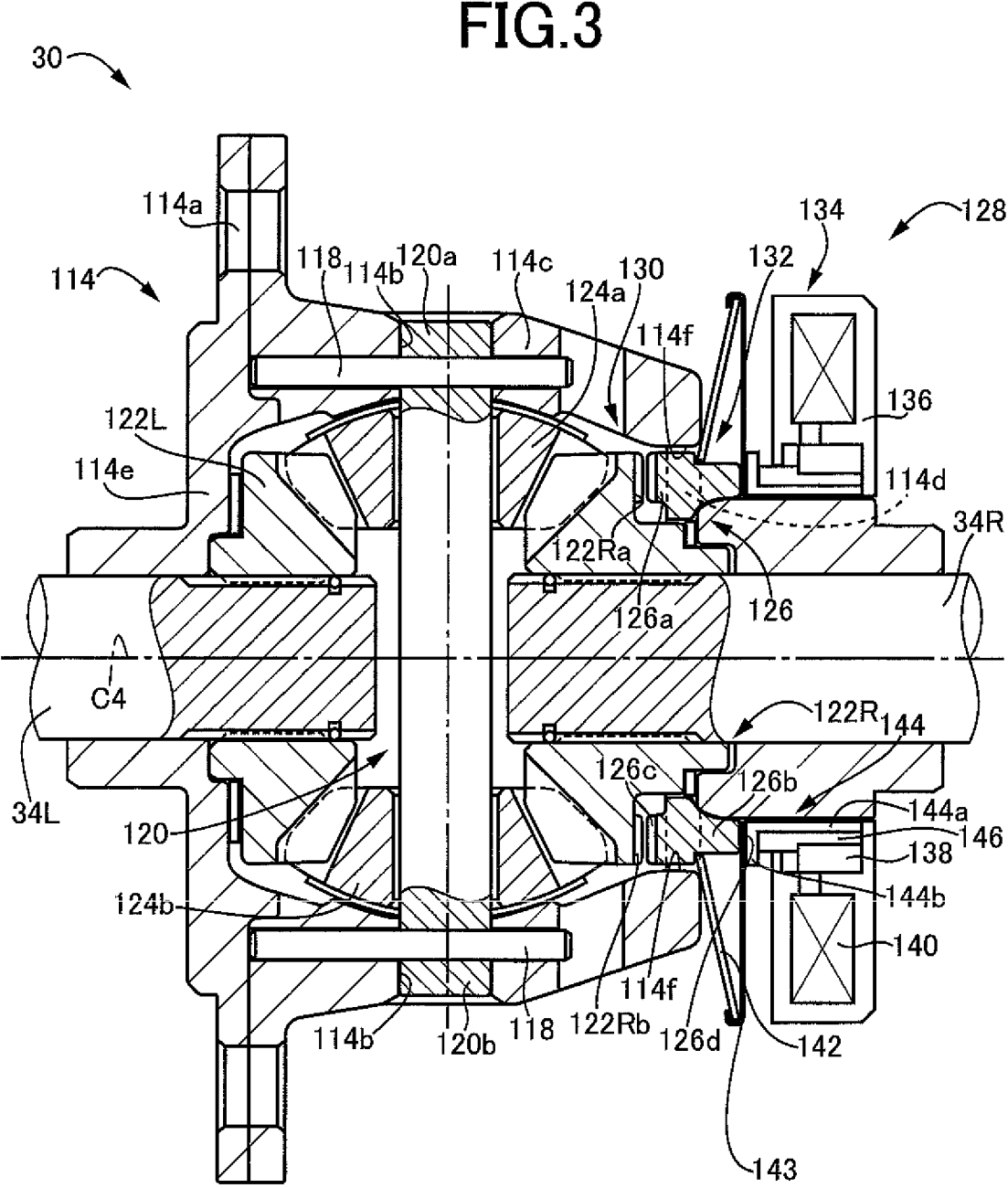
FIG. 3 is a cross-sectional view illustrating the configuration of a rear wheel differential gear device provided in the four-wheel drive vehicle of FIG. 1.

As shown in FIG. 3, the rear wheel differential gear device 30 includes: a container-shaped first differential case 114 which is supported and is rotatable about a fourth rotation axis line (first rotation axis line) C4; a first differential ring gear (see FIG. 1) 116 which is fixed to an outer circumferential portion 114a of the first differential case 114; a cylindrical first pinion shaft 120 whose both end portions 120a and 120b are supported by the first differential case 114 and which is fixed through a first knock pin 118 to the first differential case 114 such that an axis of the cylindrical first pinion shaft 120 is orthogonal to a fourth rotation axis C4 of the first differential case 114; a pair of first side gears 122L, 122R which are supported by the first differential case 114 and are rotatable about the fourth rotation axis C4 such that the first side gears 122L, 122R are located in respective opposite sides of the first pinion shaft 120 in the direction of the fourth rotation axis C4 and are disposed within the first differential case 114; and a pair of first pinions 124a,124b which engage with the pair of first side gears 122L and 122R and which are mounted on the first pinion shaft 120, such that the first pinions 124a,124b are rotatable about an axis of the first pinion shaft 120 relative to the first pinion shaft 120, and are rotatable about the fourth rotation axis C4 together with the first differential case 114.

As shown in FIG. 3, the rear wheel differential gear device 30 includes a first coupling device (coupling device) 128 which is configured to couple the first differential case 114, that is, a first movable sleeve (input side engagement member) 126 provided in the first differential case 114 and the first side gear (output side rotation member) 122R that is one of the pair of first side gears 122L, 122R in a power transmittable manner. As shown in FIG. 1, the first movable sleeve 126 is coupled to the engine 12, for example, through the first differential case 114, the rear propeller shaft 26, transfer 22, automatic transmission 20 and the like in a power transmittable manner, and the first side gear 122R is coupled to the rear wheel 16R, for example, through the rear wheel axle 34R and the like in a power transmittable manner.

As shown in FIG. 3, the first differential case 114 integrally includes: a cylindrical portion 114c having a pair of fitting holes 114b in which both end portions 120a,120b of the first pinion shaft 120 are fitted; a first wall portion 114d which is formed in an end portion of the cylindrical portion 114c on the side of the first side gear 122R in the direction of the fourth rotation axis C4 and which is opposed to the first side gear 122R; and a second wall portion 114e which is formed in an end portion of the cylindrical portion 114c on the side of the first side gear 122L in the direction of the fourth rotation axis C4 and which is opposed to the first side gear 122L. The first movable sleeve 126 includes: an annular portion 126a which is formed between a back surface 122Ra of the first side gear 122R and the first wall portion 114d of the first differential case 114 within the first differential case 114; and a plurality of protrusion portions 126b which are protruded from the annular portion 126a into a plurality of insertion holes 114f formed in the first wall portion 114d. The insertion holes 114f formed in the first wall portion 114d are a plurality of holes which penetrate in a direction parallel to the fourth rotation axis C4, and the tip end portions of the protrusion portions 126b of the first movable sleeve 126 are protruded from the insertion holes 114f. In the first movable sleeve 126 configured as described above, for example, when the first differential case 114 is rotated about the fourth rotation axis C4, the protrusion portions 126b of the first movable sleeve 126 make contact with the inner circumferential surfaces of the insertion holes 114f formed in the first wall portion 114d of the first differential case 114, and thus the first movable sleeve 126 is rotated together with the first differential case 114. The protrusion portions 126b of the first movable sleeve 126 are brought into sliding contact with the inner circumferential surfaces of the insertion holes 114f formed in the first wall portion 114d, and thus the first movable sleeve 126 is supported by the first differential case 114 and is movable in the direction of the fourth rotation axis C4 relative to the first differential case 114. In other words, the first movable sleeve 126 is supported by the first differential case 114 such that the first movable sleeve 126 is substantially unrotatable about the fourth rotation axis C4 relative to the first differential case 114 and is movable in the direction of the fourth rotation axis C4 relative to the first differential case 114.

As shown in FIG. 3, the first coupling device 128 includes: a first engagement clutch mechanism (engagement clutch mechanism) 130 which is configured to make the first movable sleeve 126 and the first side gear 122R engage with each other so as to couple them together; and a first cam mechanism (cam mechanism) 132 which is configured to assist the engagement of the first movable sleeve 126 and the first side gear 122R, depending on a first differential torque (differential torque) Ts1 by which the first movable sleeve 126 and the first side gear 122R are to be rotated differentially in a coupled state in which the first movable sleeve 126 and the first side gear 122R are coupled to each other in the first engagement clutch mechanism 130.

Figure 5:
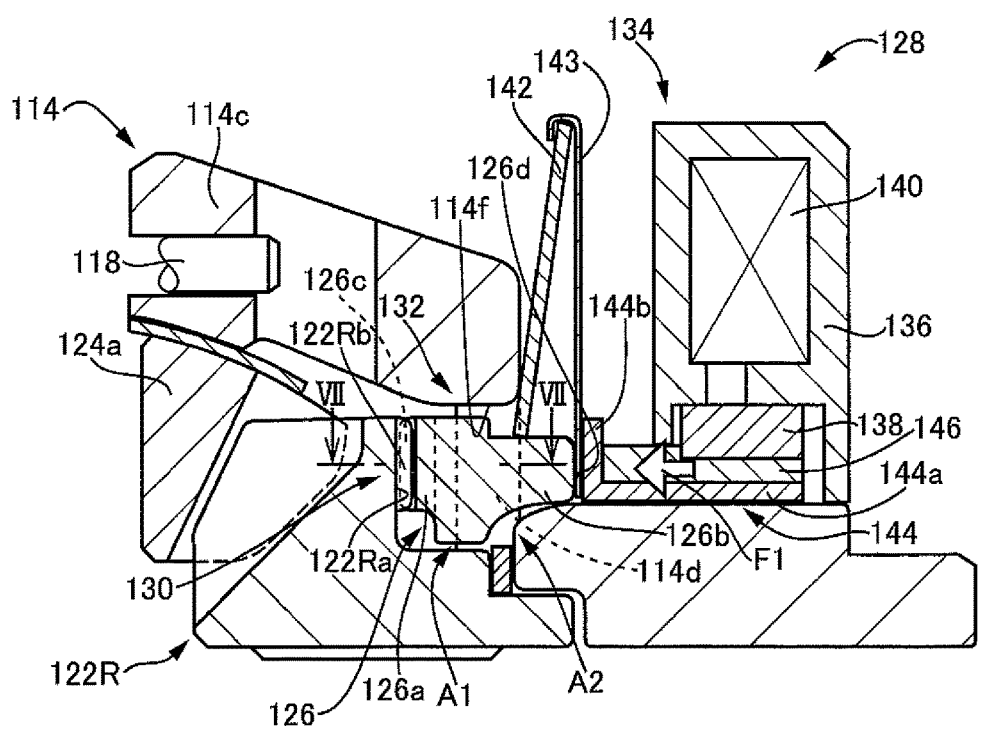
FIG. 5 is an enlarged view of the part of FIG. 3 for illustrating the configuration of the first coupling device provided in the rear wheel differential gear device of FIG. 3, and for showing a state in which the engagement of the first movable sleeve and the first side gear is established.
Figure 6:
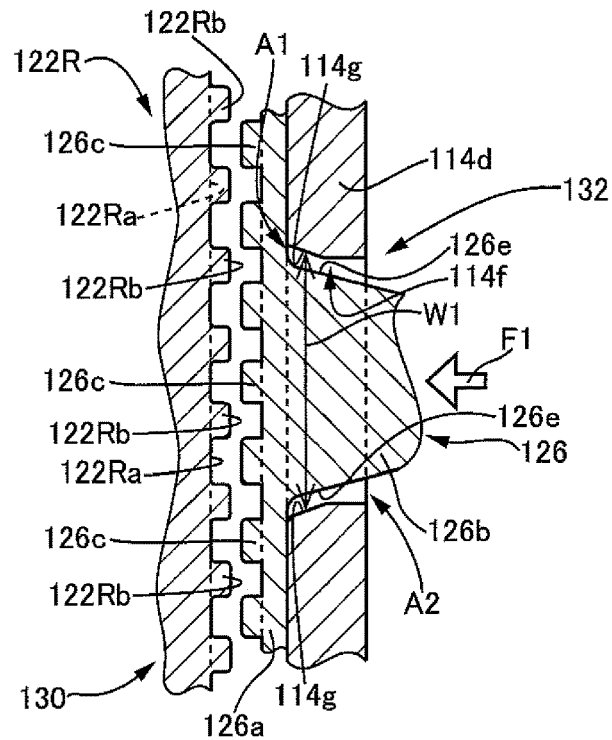
FIG. 6 is a cross-sectional view taken along line VI-VI of FIG. 4.

As shown in FIG. 3, the first engagement clutch mechanism 130 includes: a plurality of first output side engagement teeth 122Rb (see FIGS. 6 and 7) which are formed in the back surface 122Ra of the side gear 122R that is one of the pair of first side gears 122L and 122R; a plurality of first input side engagement teeth 126c (see FIGS. 6 and 7) which are formed in the annular portion 126a of the first movable sleeve 126 so as to be able to engage with the first output side engagement teeth 122Rb; and a first actuator 134 which is configured to move the first movable sleeve 126 to a selected one of a first engagement position (see FIGS. 5 and 7) in which the first input side engagement teeth 126c mesh with the first output side engagement teeth 122Rb and a first nonengagement position (see FIGS. 4 and 6) in which the first input side engagement teeth 126c do not mesh with the first output side engagement teeth 122Rb.

Figure 4:
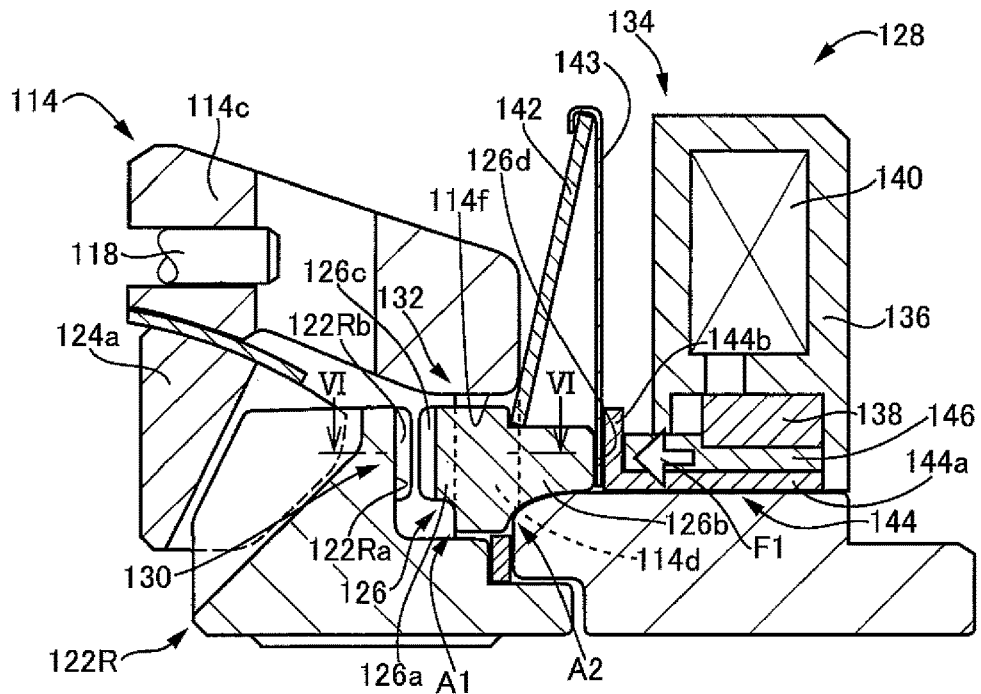
FIG. 4 is an enlarged view of apart of FIG. 3 for illustrating the configuration of a first coupling device provided in the rear wheel differential gear device of FIG. 3, and for showing a state in which the engagement of a first movable sleeve and a first side gear is released.

The first actuator 134 is a device which is configured to drive the first movable sleeve 126 with a first thrust F1 having a predetermined magnitude so as to selectively move the first movable sleeve 126 to the first engagement position or the first nonengagement position. As shown in FIGS. 4 and 5, the first actuator 134 includes: a cylindrical magnetic plunger 138 which is provided in a frame 136 fixed to a case (unillustrated) in which, for example, the rear wheel differential gear device 30 and the like are stored, such that the cylindrical magnetic plunger 138 is movable relative to the frame 136 in the direction of the fourth rotation axis C4; a first electromagnetic coil 140 which is configured to apply the first thrust F1 to the magnetic plunger 138; and a first disc spring (first return spring) 142 which constantly biases the first movable sleeve 126 such that the first movable sleeve 126 is returned to the first nonengagement position. The first disc spring 142 is disposed between a disc-shaped plate member 143 which is fixed to a side surface 126d of the protrusion portion 126b of the first movable sleeve 126 on the side of the first electromagnetic coil 140, and the first wall portion 114d of the first differential case 114. In the magnetic plunger 138 of the first actuator 134, a sliding metal 144 is provided through a cylindrical nonmagnetic plunger 146. The sliding metal 144 integrally includes: a cylindrical portion 144a which is disposed between the nonmagnetic plunger 146 and the first differential case 114; and a flange portion 144b which is protruded from an end portion of the cylindrical portion 144a on the side of the first movable sleeve 126 in a radial direction away from the fourth rotation axis C4.

In the first actuator 134 configured as described above, as shown in FIGS. 4 and 5, when a first drive current I1 is supplied from an electronic control device (control device) 150 (see FIG. 13) to the first electromagnetic coil 140, and thus the first thrust F1 is applied from the first electromagnetic coil 140 to the magnetic plunger 138, the first movable sleeve 126 is moved to the first engagement position through the sliding metal 144 against the biasing force of the first disc spring 142. When the first drive current I1 is not applied from the electronic control device 150 to the first electromagnetic coil 140, and thus the first thrust F1 is not applied from the first electromagnetic coil 140 to the magnetic plunger 138, the first movable sleeve 126 is moved to the first nonengagement position by the biasing force (elastic return force) of the first disc spring 142.

As shown in FIGS. 4 to 7, the first cam mechanism 132 includes: first case side cam surfaces (cam surfaces) 114g which are formed on the inner circumferential surfaces of the plurality of insertion holes 114f formed in the first wall portion 114d of the first differential case 114; and first sleeve side cam surfaces (cam surfaces) 126e which are formed on the outer circumferential surfaces of the protrusion portions 126b of the first movable sleeve 126. Each of the first case side cam surfaces 114g is an inclined surface which is inclined such that the width dimension W1 (see FIG. 6) of the insertion hole 114f is decreased in a direction away from an opening A1 of the insertion hole 114f on the side of the first side gear 122R toward an opening A2 of the insertion hole 114f on a side opposite to the side of the first side gear 122R. Each of the first sleeve side cam surfaces 126e is an inclined surface which is inclined such that the width dimension W2 (see FIG. 7) of the protrusion portion 126b is decreased in a direction away from the annular portion 126a in the protrusion portion 126b. In the present embodiment, each of the plurality of insertion holes 114f has two of the first case side cam surfaces 114g in respective two portions of the inner circumferential surface which are opposed to each other in a circumferential direction about the fourth rotation axis C4, while each of the plurality of protrusion portions 126b has two of the first sleeve side cam surfaces 126e in respective two portions of the outer circumferential surface which are opposed to each other in the circumferential direction. However, each of the first case side cam surfaces 114g may be constituted by a tapered surface as the inner circumferential surface of a corresponding one of the plurality of insertion holes 114f, while each of the first sleeve side cam surfaces 126e may be constituted by a tapered surface as the outer circumferential surface of a corresponding one of the plurality of protrusion portions 126b.

Figure 7:
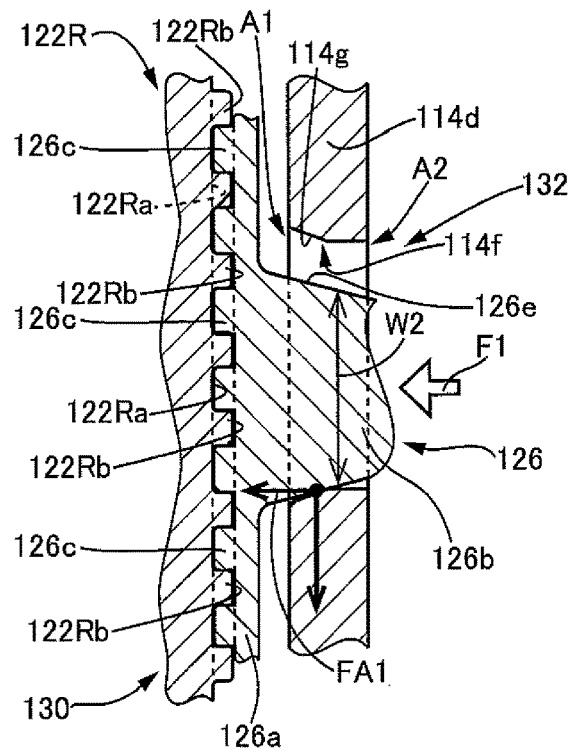
FIG. 7 is a cross-sectional view taken along line VII-VII of FIG. 5.

In the first cam mechanism 132 configured as described above, when in the coupled state in which the first output side engagement teeth 122Rb formed in the first side gear 122R and the first input side engagement teeth 126c formed in the first movable sleeve 126 engage with each other, the first differential torque Ts1, by which the first side gear 122R and the first differential case 114, that is, the first movable sleeve 126 are rotated in respective speeds different from each other about the fourth rotation axis C4, is generated, as shown in FIG. 7, for example, the protrusion portion 126b of the first movable sleeve 126 makes contact with the inner circumferential surface of the insertion hole 114f in the first differential case 114 such that the first sleeve side cam surface 126e formed on the outer circumferential surface of the protrusion portion 126b presses the first case side cam surface 114g formed on the inner circumferential surface of the insertion hole 114f. Hence, by a force by which the first sleeve side cam surface 126e of the protrusion portion 126b presses the first case side cam surface 114g, the protrusion portion 126b is forced to be moved along the first case side cam surface 114g in the direction of an arrow FA1, and thus the pressing force of the first side gear 122R of the first movable sleeve 126 onto the back surface 122Ra is increased depending on the magnitude of the first differential torque Ts1. In the first cam mechanism 132, the engagement of the first movable sleeve 126 and the first side gear 122R is assisted by the pressing force. For example, also when the inner circumferential surface of the insertion hole 114f in the first differential case 114 is brought into contact with the protrusion portion 126b of the first movable sleeve 126 by the first differential torque Ts1, and thus the first case side cam surface 114g formed on the inner circumferential surface of the insertion hole 114f in the first differential case 114 presses the first sleeve side cam surface 126e formed on the outer circumferential surface of the protrusion portion 126b, the pressing force of the first side gear 122R of the first movable sleeve 126 on the back surface 122Ra is increased depending on the magnitude of the first differential torque Ts1. The first side gear 122L is coupled through the rear wheel axle 34L to the rear wheel (left side drive wheel) 16L in a power transmittable manner, and the first side gear 122R is coupled through the rear wheel axle 34R to the rear wheel (right side drive wheel) 16R in a power transmittable manner.

In the first coupling device 128 configured as described above, when the first movable sleeve 126 is moved to the first engagement position by the first actuator 134, the first differential case 114 and the first side gear 122R which is one of the pair of first side gears 122L and 122R are coupled together in a power transmittable manner, thereby resulting in a differential lock state in which, in the rear wheel side differential gear device 30, the pair of first side gears 122L and 122R are rotated integrally together with each other. When the first movable sleeve 126 is moved by the first actuator 134 from the first engagement position to the first nonengagement position, the coupling of the first differential case 144 and the first side gear 122R is released, thereby releasing the differential lock state of the rear wheel side differential gear device 30.

Figure 8:
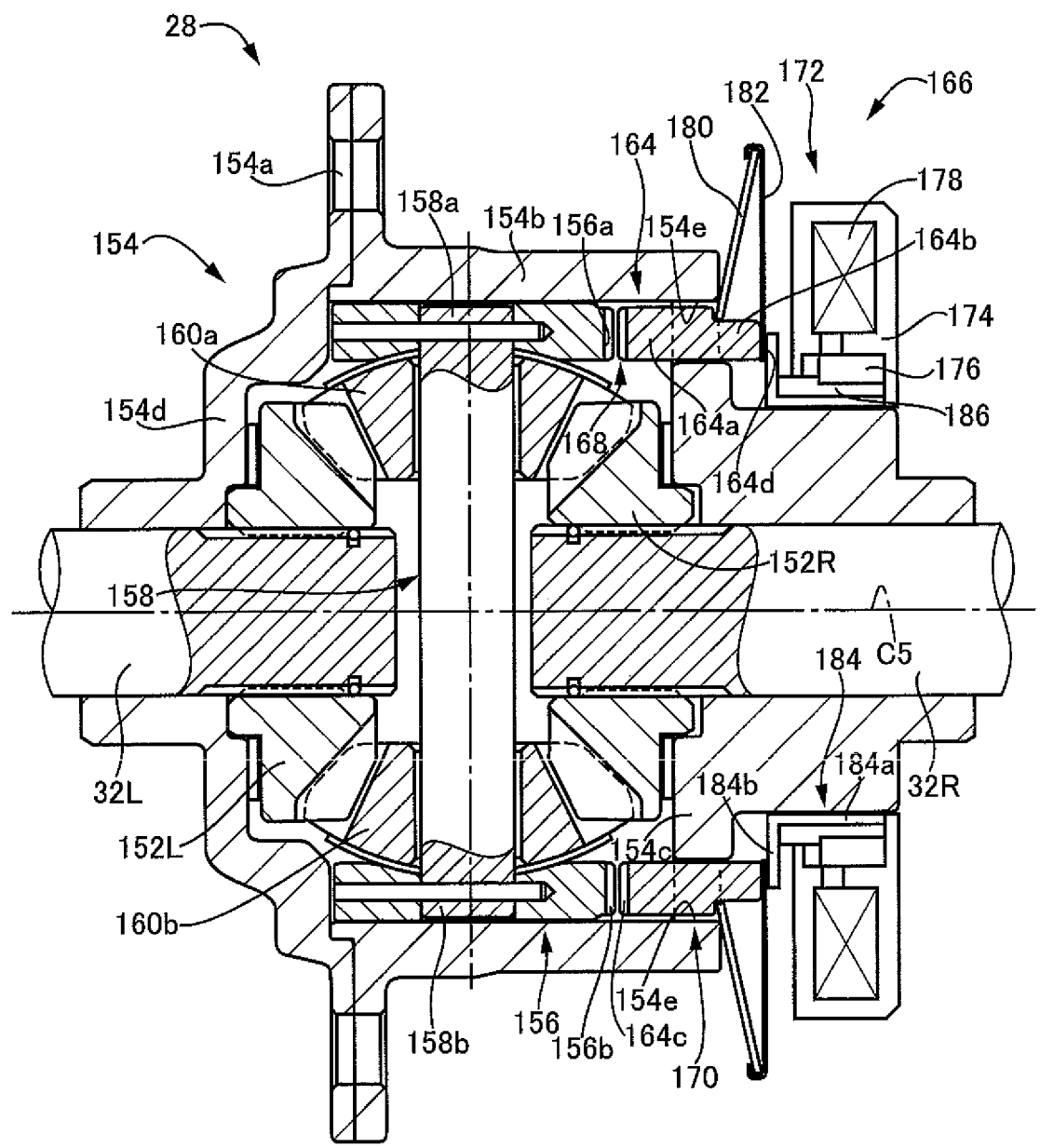
FIG. 8 is a cross-sectional view illustrating the configuration of a front wheel differential gear device provided in the four-wheel drive vehicle of FIG. 1.

As shown in FIG. 8, the front wheel differential gear device 28 includes: a second differential case 154 which stores a pair of second side gears 152L and 152R and which is supported to be rotatable about a fifth rotation axis line (second rotation axis line) C5; a second pinion shaft 158 whose both end portions 158a,158b are supported by a pinion support member (output side rotation member) 156 that will be described later; a pair of second side gears 152L, 152R which are supported by the second differential case 154 so as to be located on respective opposite sides of the second pinion shaft 158 and which are rotatable about the fifth rotation axis C5; a pair of second pinions 160a,160b through which the second pinion shaft 158 is passed such that the second pinions 160a,160b are rotatably supported by the second pinion shaft 158 and which engage with the pair of second side gears 152L, 152R; the above-described annular pinion support member 156 which is disposed within the second differential case 154 and is rotatable about the fifth rotation axis C5 relative to the second differential case 154 and which rotatably supports the pair of second pinions 160a and 160b through the second pinion shaft 158. In an outer circumferential portion 154a of the second differential case 154, a second differential ring gear 162 (see FIG. 1), which is coupled to the front propeller shaft 24 in a power transmittable manner, is integrally provided.

As shown in FIG. 8, the front wheel differential gear device 28 includes a second coupling device (coupling device) 166 which is configured to couple, in a power transmittable manner, a second movable sleeve (input side engagement member) 164 that is provided in the second differential case 154 and the pinion support member (output side engagement member) 156 that is coupled to the pair of second side gears 152L and 152R through the pair of second pinions 160a and 160b and the second pinion shaft 158 in a power transmittable manner. In other words, the second coupling device 166 couples the second differential case 154 and the pair of second side gears 152L and 152R in a power transmittable manner. As shown in FIGS. 1 and 8, when in the transfer 22, the rear wheel side output shaft 40 and the front wheel side output shaft 48 are coupled together in a power transmittable manner, the second movable sleeve 164 is coupled to the engine 12, for example, through the second differential case 154, front propeller shaft 24, transfer 22, automatic transmission 20 and the like in a power transmittable manner. The pinion support member 156 is coupled to the front wheels 14L,14R, for example, through the second pinion shaft 158, pair of second pinions 160a,160b, pair of second side gears 152L and 152R, front wheel axles 32L and 32R and the like in a power transmittable manner.

As shown in FIG. 8, the second differential case 154 integrally includes: a cylindrical portion 154b in which the pinion support member 156 is disposed on the inner circumferential side; a first wall portion 154c which is formed in an end portion of the cylindrical portion 154b on the side of the second side gear 152R in the direction of the fifth rotation axis C5 and which is opposed to the second side gear 152R; and a second wall portion 154d which is formed in an end portion of the cylindrical portion 154b on the side of the second side gear 152L in the direction of the fifth rotation axis C5 and which is opposed to the second side gear 152L. The second movable sleeve 164 integrally includes: an annular portion 164a which is formed between the pinion support member 156 and the first wall portion 154c of the second differential case 154 within the second differential case 154; and a plurality of protrusion portions 164b which are protruded from the annular portion 164a into a plurality of insertion holes 154e formed in the first wall portion 154c. The insertion holes 154e formed in the first wall portion 154c are holes which penetrate in a direction parallel to the fifth rotation axis C5, and the tip end portions of the protrusion portions 164b of the second movable sleeve 164 are protruded from the insertion holes 154e. In the second movable sleeve 164 configured as described above, for example, when the second differential case 154 is rotated about the fifth rotation axis C5, the protrusion portions 164b of the second movable sleeve 164 make contact with the inner circumferential surfaces of the insertion holes 154e formed in the first wall portion 154c of the second differential case 154, and thus the second movable sleeve 164 is rotated together with the second differential case 154. The protrusion portions 164b of the second movable sleeve 164 are brought into sliding contact with the inner circumferential surfaces of the insertion holes 154e formed in the first wall portion 154c, and thus the second movable sleeve 164 is supported by the second differential case 154 and is movable in the direction of the fifth rotation axis C5 relative to the second differential case 154. In other words, the second movable sleeve 164 is supported by the second differential case 154 such that the second movable sleeve 164 is substantially unrotatable about the fifth rotation axis C5 relative to the second differential case 154 and is movable in the direction of the fifth rotation axis C5 relative to the second differential case 154.

As shown in FIG. 8, the second coupling device 166 includes: a second engagement clutch mechanism (engagement clutch mechanism) 168 configured to make the second movable sleeve 164 and the pinion support member 156 engage with each other so as to couple them together; and a second cam mechanism (cam mechanism) 17 configured to assist the engagement of the second movable sleeve 164 and the pinion support member 156 depending on a second differential torque (differential torque) Ts2 by which the second movable sleeve 164 and the pinion support member 156 are to be rotated differentially in a coupled state in which the second movable sleeve 164 and the pinion support member 156 are coupled to each other in the second engagement clutch mechanism 168.

As shown in FIGS. 9 to 12, the second engagement clutch mechanism 168 includes: a plurality of second output side engagement teeth 156b which are formed on an end surface 156a of the pinion support member 156 on the side of the second movable sleeve 164; a plurality of second input side engagement teeth 164c which are formed in the annular portion 164a of the second movable sleeve 164 so as to engage with the second output side engagement teeth 156b; and a second actuator which is configured to move the second movable sleeve 164 to a second engagement position (see FIGS. 10 and 12) in which the second input side engagement teeth 164c engage with the second output side engagement teeth 156b or a second nonengagement position (see FIGS. 9 and 11) in which the second input side engagement teeth 164c do not engage with the second output side engagement teeth 156b.

Figure 9:
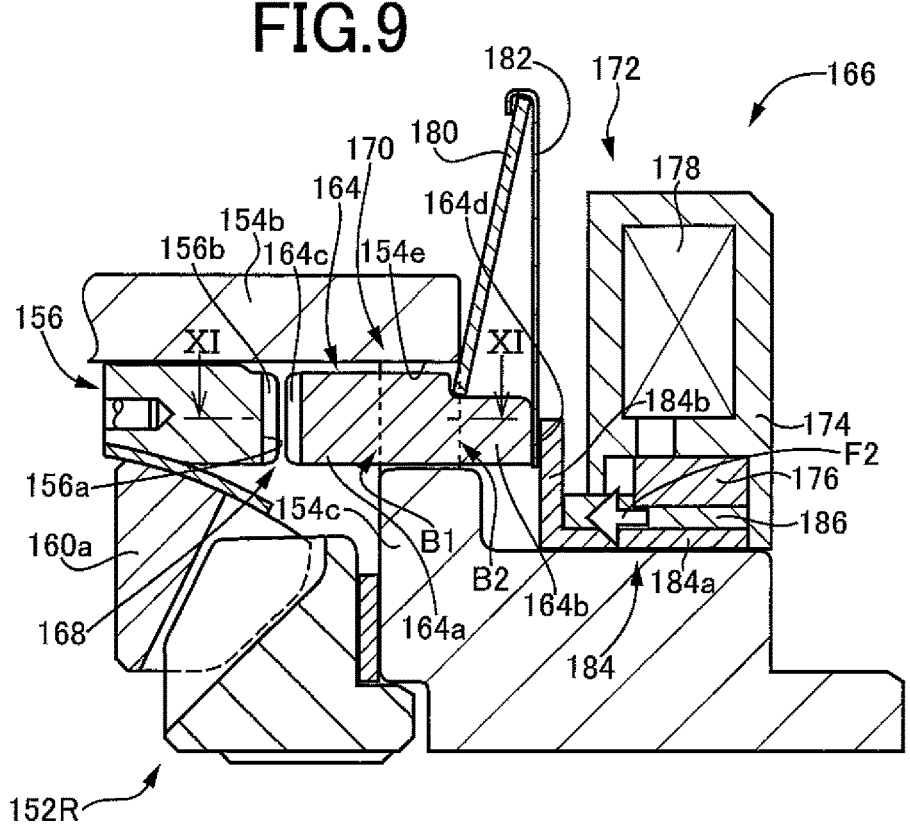
FIG. 9 is an enlarged view of apart of FIG. 8 for illustrating the configuration of a second coupling device provided in the front wheel differential gear device of FIG. 8, and for showing a state in which the engagement of a second movable sleeve and a pinion support member is released.
Figure 10:
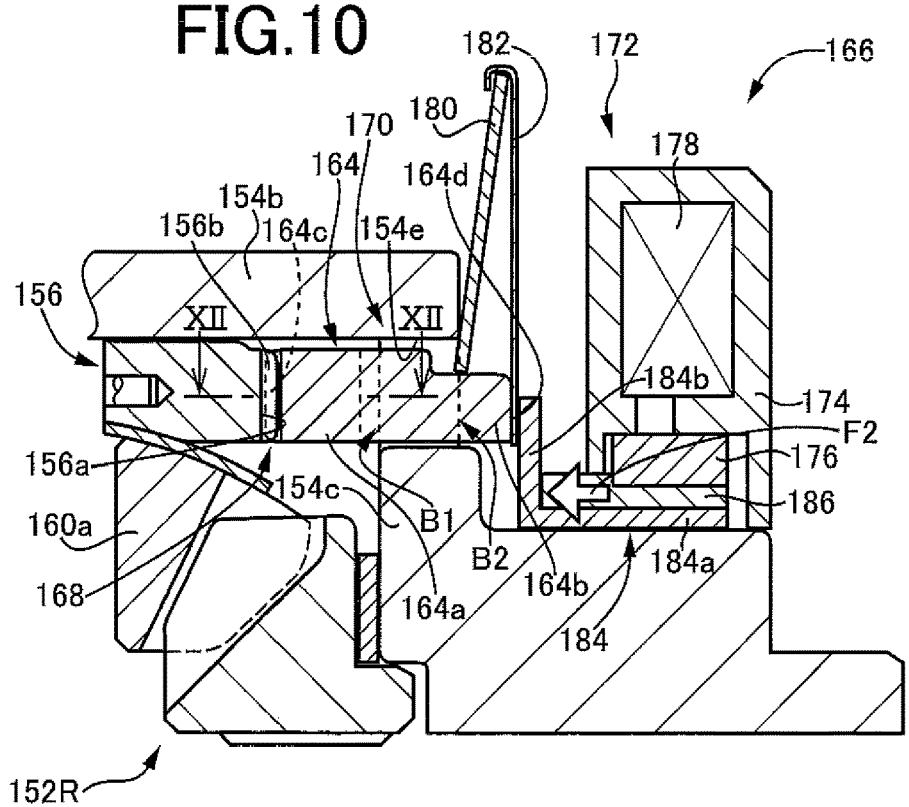
FIG. 10 is an enlarged view of the part of FIG. 8 for illustrating the configuration of the second coupling device provided in the front wheel differential gear device of FIG. 8, and for showing a state in which the engagement of the second movable sleeve and the pinion support member is established.
Figure 11:
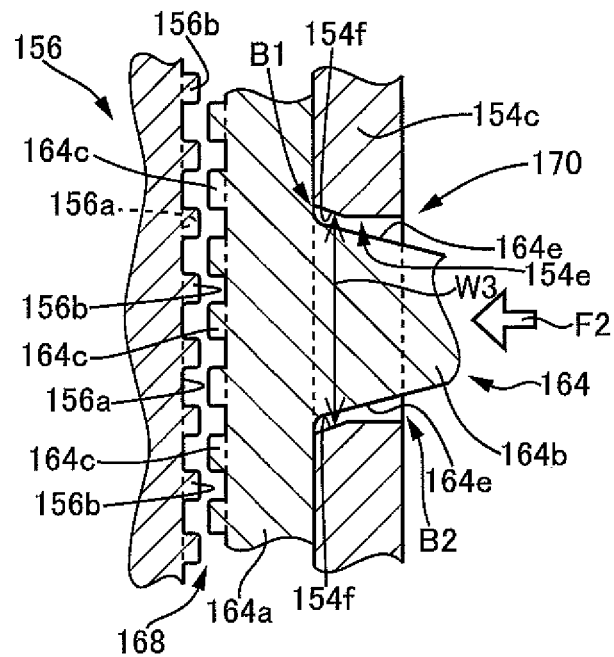
FIG. 11 is a cross-sectional view taken along line XI-XI of FIG. 9.

The second actuator 172 is a device configured to drive the second movable sleeve 164 with a second thrust F2 having a predetermined magnitude so as to move the second movable sleeve 164 to the second engagement position or the second nonengagement position. As shown in FIGS. 9 and 10, the second actuator 172 includes: a cylindrical magnetic plunger 176 which is provided in a frame 174 fixed to a case (unillustrated) in which, for example, the front wheel differential gear device 28 and the like are stored, such that the cylindrical magnetic plunger 176 is movable relative to frame 174 in the direction of the fifth rotation axis C5; a second electromagnetic coil 178 which is configured to apply the second thrust F2 to the magnetic plunger 176; a second disc spring (second return spring) 180 which constantly biases the second movable sleeve 164 such that the second movable sleeve 164 is returned to the second nonengagement position. The second disc spring 180 is disposed between a disc-shaped plate member 182 which is fixed to a side surface 164d of the protrusion portion 164b of the second movable sleeve 164 on the side of the second electromagnetic coil 178 and the first wall portion 154c of the second differential case 154. In the magnetic plunger 176 of the second actuator 172, a sliding metal 184 is provided through a cylindrical nonmagnetic plunger 186. The sliding metal 184 integrally includes: a cylindrical portion 184a which is disposed between the nonmagnetic plunger 186 and the second differential case 154; and a flange portion 184b which is protruded from an end portion of the cylindrical portion 184a on the side of the second movable sleeve 164 in a radial direction away from the fifth rotation axis C5.

In the second actuator 172 configured as described above, as shown in FIGS. 9 and 10, when a second drive current I2 is supplied from the electronic control device 150 to the second electromagnetic coil 178, and thus the second thrust F2 is applied from the second electromagnetic coil 178 to the magnetic plunger 176, the second movable sleeve 164 is moved to the second engagement position through the sliding metal 184 against the biasing force of the second disc spring 180. When the second drive current I2 is not applied from the electronic control device 150 to the second electromagnetic coil 178 and thus the second thrust F2 is not applied from the second electromagnetic coil 178 to the magnetic plunger 176, the second movable sleeve 164 is moved to the second nonengagement position by the biasing force (elastic return force) of the second disc spring 180.

As shown FIGS. 9 to 12, the second cam mechanism 170 includes: second case side cam surfaces (cam surfaces) 154f which are formed on parts of the inner circumferential surfaces of the plurality of insertion holes 154e formed in the first wall portion 154c of the second differential case 154; and second sleeve side cam surfaces (cam surfaces) 164e which are formed on parts of the outer circumferential surfaces of the protrusion portions 164b of the second movable sleeve 164. Each of the second case side cam surfaces 154f is an inclined surface which is inclined such that the width dimension W3 (see FIG. 11) of the insertion hole 154e is decreased in a direction away from an opening E1 of the insertion hole 154e on e side of the pinion support member 156 toward an opening E2 of the insertion hole 154e on a side opposite to the side of the pinion support member 156. Each of the second sleeve side cam surfaces 164e is an inclined surface which is inclined such that the width dimension W4 (see FIG. 12) of the protrusion portion 164b is decreased in a direction away from the annular portion 164a in the protrusion portion 164b. In the present embodiment, each of the p plurality of insertion holes 154e has two of the second case side cam surfaces 154f in respective two portions of the inner circumferential surface which are opposed to each other in a circumferential direction about the fifth rotation axis C5, while each of the plurality of protrusion portions 164b has two of the second sleeve side cam surfaces 164e in respective two portions of the outer circumferential surface which are opposed to each other in the circumferential direction. However, each of the second case side cam surfaces 154f may be constituted by a tapered surface as the inner circumferential surface of corresponding one of the plurality of insertion holes 154e, while each of the second sleeve side cam surfaces 164e may be constituted by a tapered surface as the outer circumferential surface of a corresponding one of the plurality of protrusion portions 164b.

Figure 12:
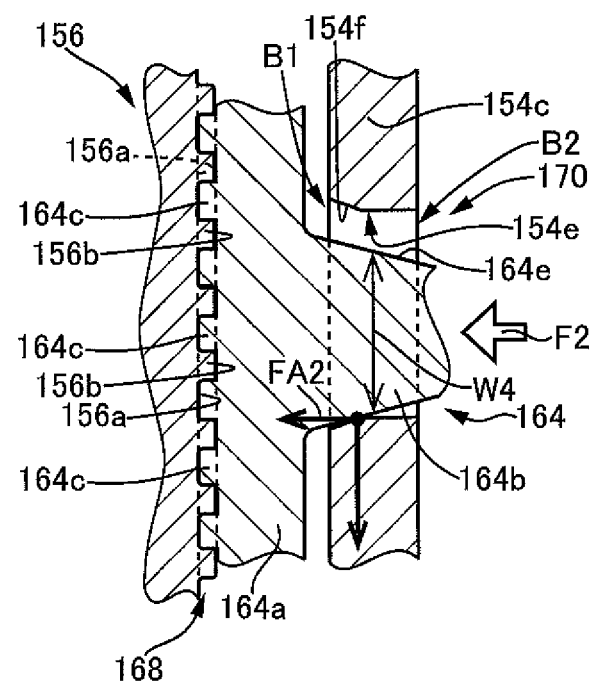
FIG. 12 is a cross-sectional view taken along line XII-XII of FIG. 10.

In the second cam mechanism 170 configured as described above, when in the coupled state in which the second output side engagement teeth 156b formed in the pinion support member 156 and the second input side engagement teeth 164c formed in the second movable sleeve 164 engage with each other, the second differential torque Ts2, by which the pinion support member 156 and the second differential case 154, that is, the second movable sleeve 164 are rotated in respective speeds different from each other about the fifth rotation axis C5 is generated, as shown in FIG. 12, for example, the protrusion portion 164b of the second movable sleeve 164 makes contact with the inner circumferential surface of the insertion hole 154e in the second differential case 154 such that the second sleeve side cam surface 164e formed on the outer circumferential surface of the protrusion portion 164b presses the second case side cam surface 154f formed on the inner circumferential surface of the insertion hole 154e. Hence, by a force by which the second sleeve side cam surface 164e of the protrusion portion 164b presses the second case side cam surface 154f, the protrusion portion 164b is forced to be moved along the second case side cam surface 154f in the direction of an arrow FA2, and thus the pressing force of the second movable sleeve 164 on the end surface 156a of the pinion support member 156 is increased depending on the magnitude of the second differential torque Ts2. In the second cam mechanism 170, the engagement of the second movable sleeve 164 and the pinion support member 156 is assisted by the pressing force. For example, also when the inner circumferential surface of the insertion hole 154e in the second differential case 154 is brought into contact with the protrusion portion 164b of the second movable sleeve 164 by the second differential torque Ts2, and thus the second case side cam surface 154f formed on the inner circumferential surface of the insertion hole 154e in the second differential case 154 presses the second sleeve side cam surface 164e formed on the outer circumferential surface of the protrusion portion 164b, the pressing force of the second movable sleeve 164 on the end surface 156a of the pinion support member 156 increased depending on the magnitude of the second differential torque Ts2. The pair of second side gears 152L and 152R which are coupled to the pinion support member 156 in a power transmittable manner are coupled to the pair of left and right front wheels 14L, 14R, for example, through the front wheel axles 32L and 32R and the like in a power transmittable manner. When in the transfer 22, the rear wheel side output shaft 40 and the front wheel side output shaft 48 are coupled together in a power transmittable manner, the second differential case 154 which is coupled to the second movable sleeve 164 in a power transmittable manner is coupled to the pair of left and right rear wheels 16L, 16R, for example, through the front propeller shaft transfer 22, rear propeller shaft 26, rear wheel differential gear device 30, rear wheel axles 34L and 34R and the like in a power transmittable manner.

In the second coupling device 166 configured as described above, when the second movable sleeve 164 is moved by the second actuator 172 to the second engagement position, the second movable sleeve 164 and the pinion support member 156 are coupled together in a power transmittable manner, thereby resulting in a connected state in which, in the front wheel side differential gear device 28, a power transmission path between the second differential case 154 and the pair of second side gears 152L and 15R is connected. When the second movable sleeve 164 is moved by the second actuator 172 from the second engagement position to the second nonengagement position, the coupled state is released, so that the power transmission path between the second differential case 154 and the pair of second side gears 152L and 152R is disconnected.

With reference back to FIG. 1, the four-wheel drive vehicle 10 includes a braking device 188 which is a so-called disc brake that is well-known as a normally used brake and which generates a braking force that is to be applied to the front wheels 14L, 14R and the rear wheels 16L, 16R. As shown in FIG. 1, the braking device 188 includes: discs 190 which are provided so as to be respectively fixed to the front wheel axles 32L and 32R and the rear wheel axles 34L and 34R and which are respectively rotated together with the front wheels 14L, 148 and the rear wheels 16L, 16R; calipers 196 which are provided in the members constituting a suspension coupled to a vehicle body and the like; a brake actuator 198; and the like. The calipers 196 receive the supply of brake hydraulic pressures from a master cylinder 194 and the like according to the amount of operation of a brake pedal 192 so as to squeeze the discs 190 through brake pads (unillustrated) by sandwiching them. The brake actuator 198, for example, includes: a hydraulic pump configured to generate the original pressure of the brake hydraulic pressures; an accumulator; a plurality of solenoid valves 200 which adjust the brake hydraulic pressures applied to the calipers 196 included in the individual wheels; and the like, and the brake actuator 198 is a device configured to supply the brake hydraulic pressures to the calipers 196 of the individual wheels according to a command from the electronic control device 150 so as to adjust and control the supplied brake hydraulic pressures.

Figure 13:
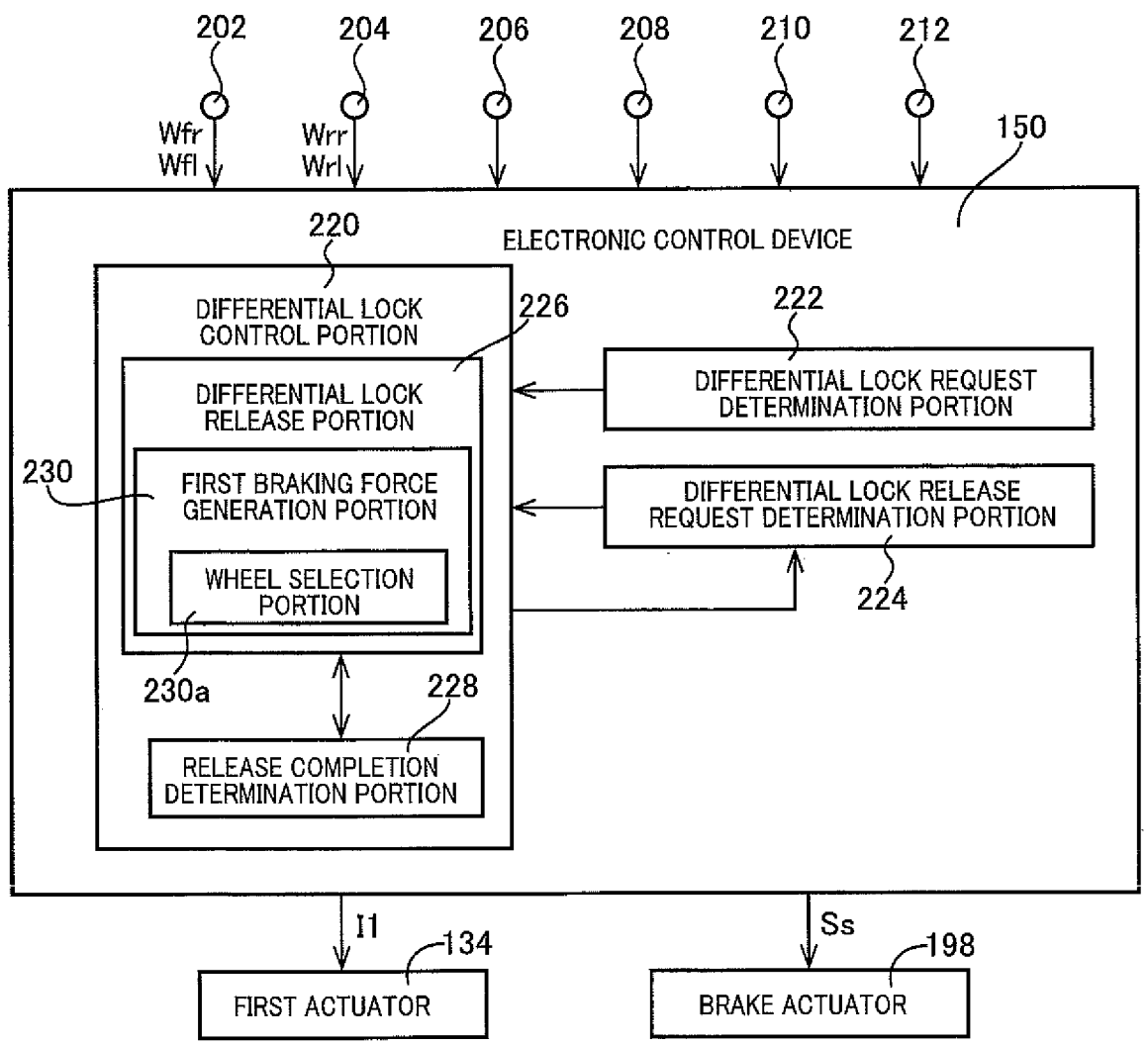
FIG. 13 is a function block diagram illustrating a main part of a control function included in an electronic control device provided in the four-wheel drive vehicle of FIG. 1.

FIG. 13 is a function block diagram illustrating a main part of a control function included in the electronic control device 150 provided in the four-wheel drive vehicle 10. As shown in FIG. 13, various types of input signals which are detected by respective sensors provided in the four-wheel drive vehicle 10 are supplied to the electronic control device 150. For example, signals which indicate the rotation speeds Wfl and Wfr (rpm) of the front wheels 14L, 14R detected by a first wheel speed sensor 202, signals which indicate the rotation speeds Wrl and Wrr (rpm) of the rear wheels 16L, 16R detected by a second wheel speed sensor 204, an on/off signal which is detected by a first position switch 206 and which indicates whether or not the first movable sleeve 126 is positioned in the first engagement position, an on/off signal which is detected by a second position switch 208 and which indicates whether car not the second movable sleeve 164 is positioned in the second engagement position, a signal which is detected by a brake sensor 210 and which indicates the depression of the brake pedal 192 and an on/off signal which is detected by a differential lock traveling mode switch 212 and which indicates whether or not a differential lock traveling mode in which vehicle traveling is performed the differential rotation of the pair of first side gears 122L and 122R being restricted is selected, are input to the electronic control device 150.

The electronic control device 150 supplies various types of output signals to the devices provided in the four-wheel drive vehicle 10. For example, the first drive current I1 which is supplied to the first actuator 134 in order to selectively move the first movable sleeve 126 to the first engagement position or the first nonengagement position in the first coupling device 128, the second drive current I2 (see FIG. 17) which is supplied to the second actuator 172 in order to selectively move the second movable sleeve 164 to the second engagement position or the second nonengagement position in the second coupling device 166, a third drive current I3 (see FIG. 17) which is supplied to the electric motor 80 in order to selectively move, for example, the fork shaft 98 to the low gear position or the high gear position in the transfer 22 and a command signal Ss which is supplied to the solenoid valves 200 provided in the brake actuator 198 in order to control the brake hydraulic pressures applied to the calipers 196, are supplied to the portions of the electronic control device 150.

In order to selectively move the first movable sleeve 126 to the first engagement position or the first nonengagement position, a differential lock control portion 220 shown in FIG. 13 is configured to control the first drive current I1 supplied to the first electromagnetic coil 140 included in the first actuator 134.

A differential lock request determination portion 222 determines whether or not a differential lock request for requesting the restriction of the differential rotation of the pair of first side gears 122L and 122R in the rear wheel side differential gear device 30 is present during vehicle traveling. For example, the differential lock request determination portion 222 determines that the differential lock request is present when a driver operates a differential lock traveling mode selection switch 212 that selects the differential lock traveling mode in which the differential rotation of the pair of first side gears 122L and 122R is restricted and in which, for example, the vehicle travels by preventing the wheels from idling on a road in bad condition such as a rough road surface.

When the differential lock request determination portion 222 determines that the differential lock request is present, the differential lock control portion 220 supplies the first drive current I1 to the first electromagnetic coil 140 included in the first actuator 134. The first drive current I1 is supplied to the first electromagnetic coil 140, and thus the first thrust F1 is applied from the first electromagnetic coil 140 through the magnetic plunger 138 to the first movable sleeve 126, so that the first movable sleeve 126 is moved to the first engagement position against the biasing force of the first disc spring 142. In this way, the first differential case 114 and the first side gear 122R which is one of the pair of first side gears 122L and 122R are coupled together in a power transmittable manner, and thus in the rear wheel side differential gear device 30, the differential rotation of the pair of first side gears 122L and 122R is restricted, thereby establining the differential lock state in which the pair of first side gears 122L and 122R are rotated together.

When the first drive current I1 is supplied to the first actuator 134 by the differential lock control portion 220, a differential lock release request determination portion 224 determines whether or not a differential lock release request requesting the release of the restriction of the differential rotation of the pair of first side gears 122L and 122R is present. For example, the differential lock release request determination portion 224 determines that the differential lock release request is present when the differential lock traveling mode selection switch 212 which has been operated by the driver is operated again by the driver.

As shown in FIG. 13, the differential lock control portion 220 includes a differential lock release portion 226 and a release completion determination portion 228. When the differential lock release request determination portion 224 determines that the differential lock release request is present, the differential lock release portion 226 stops the supply of the first drive current I1 which is supplied to the first electromagnetic coil 140 included in the first actuator 134.

The first drive current I1 is stopped from being supplied to the first electromagnetic coil 140, and thus the first movable sleeve 126 is biased such that the first movable sleeve 126 is returned to the first nonengagement position by the biasing force of the first disc spring 142. When the first movable sleeve 126 is moved by the biasing force of the first disc spring 142 from the first engagement position to the first nonengagement position, the engagement of the first input side engagement teeth 126c of the first movable sleeve 126 and the first output side engagement teeth 122Rb of the first side gear 122R is released, and thus in the rear wheel side differential gear device 30, the restriction of the differential rotation of the pair of first side gears 122L and 122R is released.

When the differential lock release portion 226 stops the supply of the first drive current I1 to the first actuator 134, the release completion determination portion 228 determines whether or not the restriction of the differential rotation of the pair of first side gears 122L and 122R is actually released such that the differential lock state is released, that is, determines whether or not the first movable sleeve 126 is located in the first nonengagement position. For example, the release completion determination portion 228 determines that the differential lock state is actually released when the first position sensor 206 detects that the first movable sleeve 126 is located in a position other than the first engagement position, that is, in the first nonengagement position.

As shown in FIG. 13, the differential lock release portion 226 includes a first braking force generation portion 230, and the first braking force generation portion 230 includes a wheel selection portion 230a. When the release completion determination portion 228 determines that a time to during which the release completion determination portion 228 determines that the differential lock state is not actually released exceeds a predetermined time ta1, that is, determines that the first movable sleeve 126 cannot be moved from the first engagement position to the first nonengagement position only by the biasing force of the first disc spring 142, due to the first differential torque Ts1 that is generated in the first coupling device 128, the first braking force generation portion 230 generates a first braking force (braking force) Br1 (N) that is to be applied to one of the first movable sleeve 126 and the first side gear 122R so as to reduce the first differential torque Ts1, that is, one of the rear wheels 16L, 16R so as to reduce the first differential torque Ts1.

When the time ta during which the release completion determination portion 228 determines that the differential lock state is not actually released exceeds the predetermined time ta1, the wheel selection portion 230a selects one of the rear wheel 122L and the rear wheel 122R to which the first braking force Br1 generated by the first braking force generation portion 230 is to be applied in order to reduce the first differential torque Ts1. For example, when the time ta during which the release completion determination portion 223 determines that the differential lock state is not actually released exceeds the predetermined time ta1, the wheel selection portion 230a selects one of the rear wheels 16L, 16R whose rotation speed Wrl, Wrr is higher among the rotation speeds Wrl and Wrr (rpm) of the rear wheels 16L, 16R detected by the second wheel speed sensor 204. When the first differential torque Ts1 is generated, for example, the left and right rear wheel axles 34L and 34R are twisted by the first differential torque Ts1, and, for example, by a change in twisting caused by restoring the twisting of one of the rear wheel axles 34L and 34R, the higher rotation side of the rear wheels 16L, 16R slips, so that a rotational difference is caused between the rear wheel 16L and the rear wheel 16R.

When the wheel selection portion 230a selects one of the rear wheels 16L, 16R to which the first braking force Br1 is to be applied, the first braking force generation portion 230 supplies the command signal Ss to the solenoid valve 200 of the brake actuator 198 such that the brake hydraulic pressure of the caliper 196 provided in the selected one of the rear wheels 16L, 16R is increased to such a degree that causes the first braking force Br1 to be applied to the selected one of the rear wheels 16L, 16R. In the first braking force generation portion 230, the first braking force Br1 is generated for a predetermined time td which is previously set, and the magnitude of the first braking force Br1 and the predetermined time td during which the first braking force Br1 is to be generated are set such that the driver does not sense deceleration during vehicle traveling. In the first braking force generation portion 230, the first braking force Br1 is applied to one of the rear wheels 16L, 16R which is selected in the wheel selection portion 230a and whose rotation speed Wrl, Wrr higher, that is, one of the rear wheels 16L, 16R coupled to one of the rear wheel axles 34L and 34R which remains twisted by the first differential torque Ts1 without yet restoring the original shape, and thus the twisting of the rear wheel axle 34L, 34R is suitably decreased, and the first differential torque Ts1 is reduced, so that the first differential case 114 and the first side gear 122R, that is, the first movable sleeve 126 and the first side gear 122R are rotated together.

Figure 14:
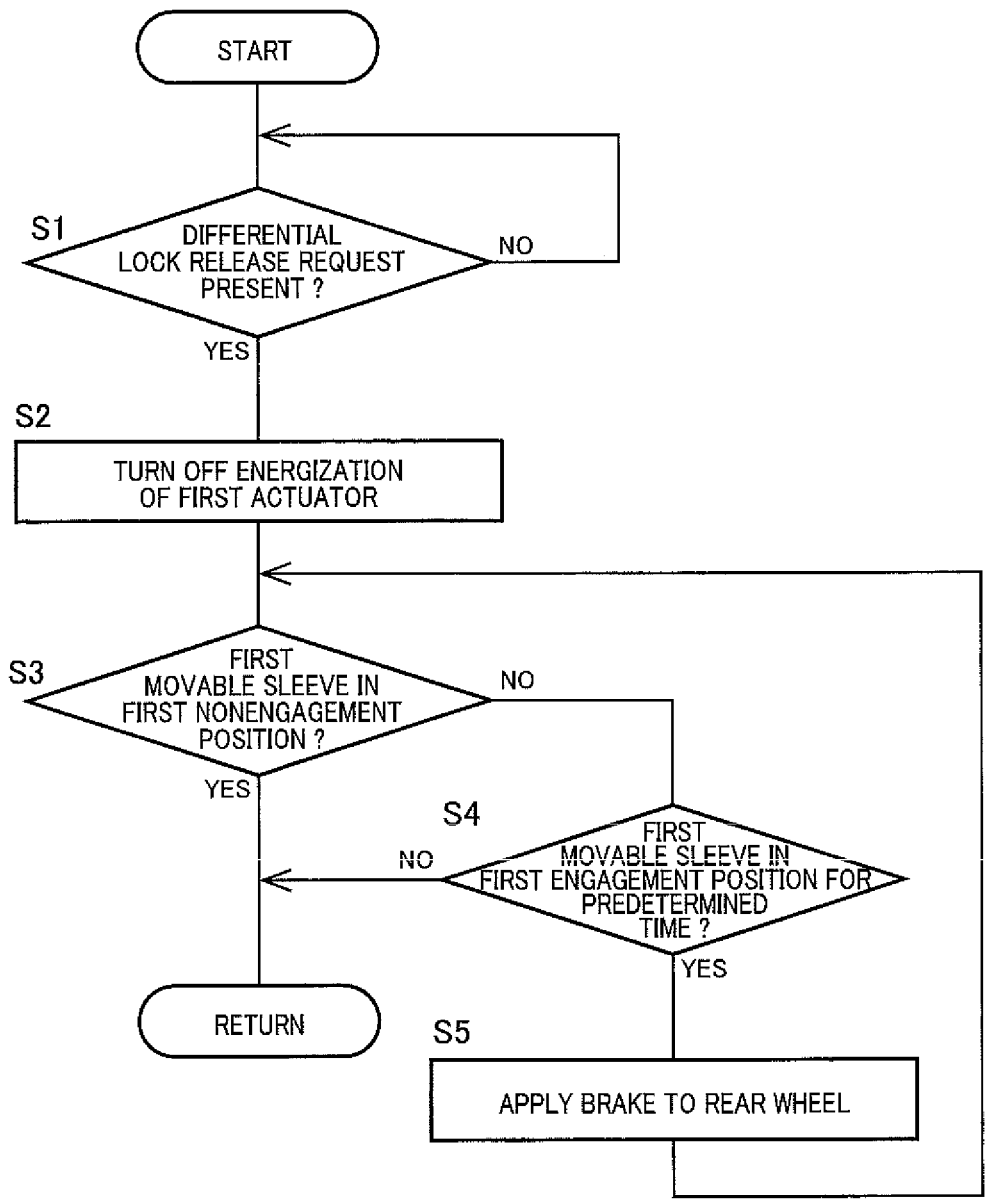
FIG. 14 is a flowchart illustrating an example of an operation in which, in the electronic control device of FIG. 13, during two-wheel drive traveling, a differential lock state in which the differential rotation of the pair of first side gears is restricted in the rear wheel side differential gear device, is released.
Figure 15:
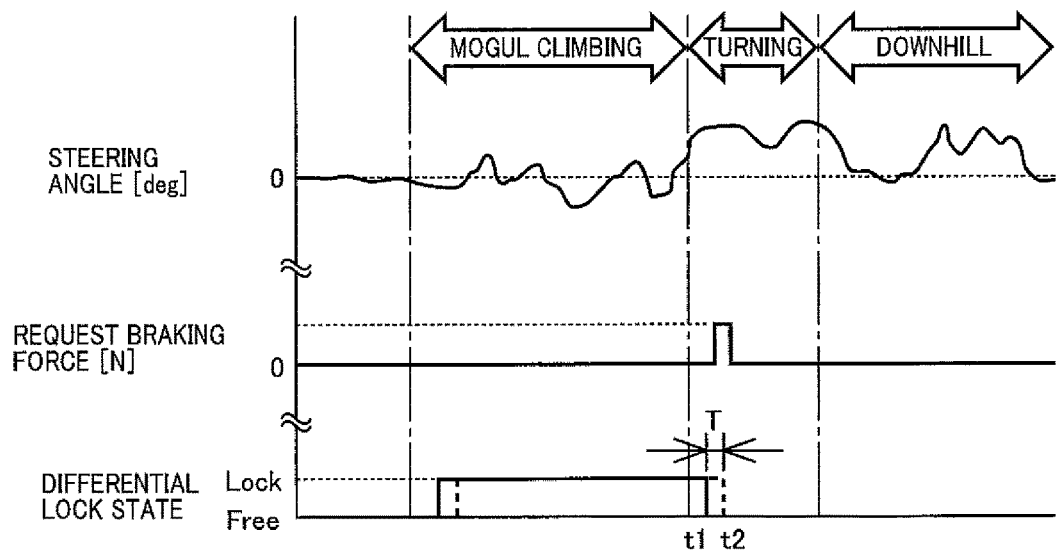
FIG. 15 is a time chart when the operation shown in the flowchart of FIG. 14 is executed.

FIG. 14 is a flowchart illustrating an example of an operation in which, in the electronic control device 150, for example, during two-wheel drive traveling, the differential lock state in which the differential rotation of the pair of first side gears 122L and 122R is restricted in the rear wheel side differential gear device 30 is released. FIG. 15 is a time chart when the operation shown in the flowchart of FIG. 14 is executed.

First, in step S1 (in the following description, the "step" is omitted) corresponding to the function of the differential lock release request determination portion 224, whether or not the differential lock release request for requesting the release of the differential lock state in which the differential rotation of the pair of first side gears 122L and 122R is restricted is present is determined. When the determination of S1 is no, S1 is executed again. When the determination of S1 is yes (time t1 in FIG. 15), S2 corresponding to the function of the differential lock release portion 226 is executed. In S2, the supply of the first drive current I1 supplied to the first electromagnetic coil 140 included in the first actuator 134 is stopped, that is, the energization of the first actuator 134 is turned off.

Next, in S3 corresponding to the function of the release completion determination portion 228, whether or not the restriction of the differential rotation of the pair of first side gears 122L and 122R is actually released, that is, whether or not the first movable sleeve 126 is positioned in the first nonengagement position is determined. When the determination of S3 is yes (time t2 in FIG. 15), the present routine is completed. When the determination of S3 is no, S4 corresponding to the function of the first braking force generation portion 230 is executed. In S4, whether or not the first movable sleeve 126 is positioned in the first engagement position for the predetermined time ta1 after the stop of the supply of the first drive current I1 in S2 is determined. When the determination of S4 is no the present routine is completed. When the determination of S4 is yes, S5 corresponding to the function of the first braking force generation portion 230 is executed. In S5, the first braking force Br1 is applied to one of the rear wheels 16L, 16R whose rotation speed Wrl, Wrr is higher, so as to brake the one of the rear wheels 16L, 16R.

Figure 16:
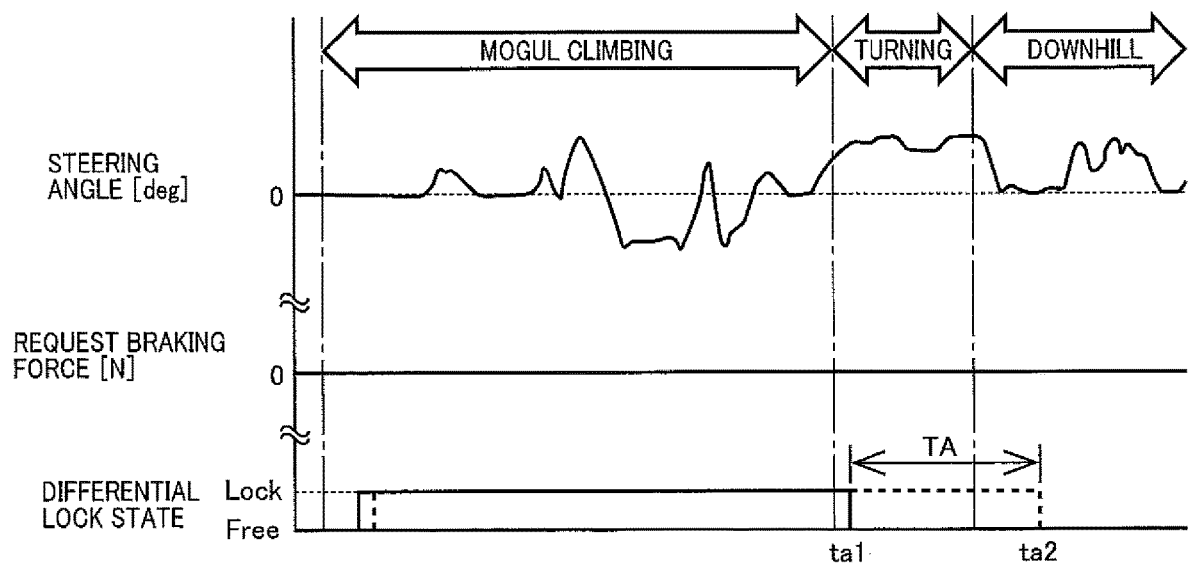
FIG. 16 is a diagram showing a time chart from the differential lock state until the differential lock state is released in a four-wheel drive vehicle in a case where a conventional electronic control device is used, wherein the conventional electronic control device is substantially identical with the electronic control device of FIG. 13 except absence of a first braking force generation portion.

FIG. 16 is a diagram showing a time chart from the differential lock state until the differential lock state is released in the four-wheel drive vehicle 10 in a case where, unlike the present example, for example, the electronic control device 150, a conventional electronic control device in which the first braking force generation portion 230 is not provided is used, that is, in a case where the first movable sleeve 126 is moved from the first engagement position to the first nonengagement position only by the biasing force of the first disc spring 142. As shown in FIG. 16, for example, even during turn traveling, it is determined that the differential lock release request for requesting the release of the differential lock state from the differential lock state is present (time ta1 in FIG. 16), and thus the supply of the first drive current is stopped, due to the first differential torque Ts1 generated during turn traveling, the first movable sleeve 126 is not moved from the first engagement position to the first nonengagement position only by the biasing force of the first disc spring 142. Hence, when the vehicle is switched from turn traveling to downhill traveling, and thus the first differential torque Ts1 is reduced, the first movable sleeve 126 is moved from the first engagement position to the first nonengagement position by the biasing force of the first disc spring 142, so that the differential lock state is eventually released (time ta2 in FIG. 16). In this way, a time TA (ta2−ta1) until the differential lock is released from the differential lock state is longer than in the present example. On the other hand, in FIG. 15, for example, during turn traveling, it is determined that the differential lock release request for requesting the differential lock state to be released is present (time t1 in FIG. 15), and then it is determined that the first movable sleeve 126 is not moved to the first nonengagement position for the predetermined time ta1 after the stop of the supply of the first drive current I1, that is, it is determined that the first differential torque Ts1 is generated, the first braking force Br1 is applied to one of the rear wheels 16L, 16R so as to reduce the first differential torque Ts1, and thus during turn traveling, the first movable sleeve 126 is moved from the first engagement position to the first nonengagement position by the biasing force of the first disc spring 142, so that the differential lock state is released (time t2 in FIG. 15). In other words, a time T (t2−t1) until the differential lock is released from the differential lock state is advantageously reduced as compared with a conventional case. The "mogul climbing" shown in FIGS. 15 and 16 means climbing on a rough road surface.

As described above, in the four-wheel drive vehicle 10 of the present example, when the coupled state is to be released in the first engagement clutch mechanism 130, namely, when the engagement of the first movable sleeve 126 and the first side gear 122R is to be released, the first braking force Br1 is applied to one of the rear wheels 16L, 16R such that the first differential torque Ts1 is reduced. Thus, when the engagement of the first movable sleeve 126 and the first side gear 122R is to be released, the first differential torque Ts1 is reduced by the application of the first braking force Br1. Owing to this arrangement, it is possible to advantageously reduce the time T required to release the engagement of the first movable sleeve 126 and the first side gear 122R, thereby eliminating needs of increase of the biasing force of the first disc spring 142 and increase of a size of the first actuator 134, for example, which have been required conventionally. Therefore, it is possible to advantageously reduce the time T required to release the coupled state in the first engagement clutch mechanism 130, namely, to release the engagement of the first movable sleeve 126 and the first side gear 122R, while suppressing increases in the size and mass of the first coupling device 128.

In the four-wheel drive vehicle 10 of the present example, the rear wheel differential gear device 30 includes the first differential case 114 which is supported to be rotatable about the fourth rotation axis line C4. The first movable sleeve 126 is supported by the first differential case 114, such that the first movable sleeve 126 is substantially unrotatable about the fourth rotation axis line C4 relative to the first differential case 114, and is movable in the direction of the fourth rotation axis line C4 relative to the first differential case 114. The first side gear 122R is one of the pair of first side gears 122L, 122R which are held in the first differential case 114 and are rotatable about the fourth rotation axis line C4. The first engagement clutch Mechanism 130 includes: the first output side engagement teeth 122Rb which are formed in the back surface Ra of the first side gear 122R; the first input side engagement teeth 126c which are formed in the first movable sleeve 126 and are to engage with the first output side engagement teeth 122Rb; and the first actuator 134 which is configured to move the first movable sleeve 126 to the first engagement position in which the first input side engagement teeth 126e engage with the first output side engagement teeth 122Rb or the first nonengagement position in which the first input side engagement teeth 126c do not engage with the first output side engagement teeth 122Rb. When the first movable sleeve 126 is moved to the first engagement position by the first actuator 134, the first differential case 114 and the first side gear 122R are coupled to each other. When the first movable sleeve 126 is moved by the first actuator 134 from the first engagement position to the first nonengagement position, the coupling of the first differential case 114 and the first side gear 122R is released. Thus, while suppressing increase of the size of the first actuator 134, it is possible to reduce the time T required to release the differential lock state of the rear wheel differential gear device 30 in which the first differential case 114 and the first side gear 122R are coupled to each other whereby the pair of first side gears 122L, 122R are to be rotated integrally with each other.

In the four-wheel drive vehicle 10 of the present example, the cam mechanism 132 includes the first case side cam surfaces 114g and the first sleeve side cam surfaces 126e provided on the opposed surfaces of the first differential case 114 and the first movable sleeve 126 (that substantially unrotatable about relative to the first differential case 114), which are opposed to each other in the circumferential direction about the fourth rotation axis line C4, such that the first movable sleeve 126 is pressed against the back surface 222Ra of the first side gear 122R, by the pressing farce that is increased depending on the first differential torque Ts1. Thus, the pressing force is reduced with the first differential torque Ts1 being reduced by application of the first braking force Br1 to the one of the first movable sleeve 126 and the first side gear 122R, so that it is possible to advantageously reduce a force required by the first actuator 134 to move the first movable sleeve 126 from the first engagement position to the first nonengagement position.

In the four-wheel drive vehicle 10 of the present example, the first actuator 134 includes the first disc spring 142 which constantly forces the first movable sleeve 126 in a direction toward the first nonengagement position away from the first engagement position, and the first actuator 134 is configured to move the first movable sleeve 126 to the first engagement position against the biasing force of the first disc spring 142, and moves the first movable sleeve 126 to the first nonengagement position by the biasing force of the first disc spring 142. Thus, owing to the reduction of the pressing force by the reduction of the first differential torque Ts1, it is possible to reduce the biasing force of the first disc spring 142 and accordingly to advantageously reduce the size of the first actuator 134.

In the four-wheel drive vehicle 10 of the present example, the pair of left and right rear wheels 16L, 16R are coupled to the pair of first side gears 122L, 122R in a power transmittable manner. When the first movable sleeve 126 is to be moved by the first actuator 134 from the first engagement position to the first nonengagement position so as to release the coupling of the first differential case 114 and the first side gear 122R, the electronic control device 150 is configured to cause the first braking force Br1 to be applied to one of the rear wheels 16L, 16R, wherein the rotation speed Wrl, Wrr of the one of rear wheels 16L, 16R is higher than that of the other of the rear wheels 16L, 16R. Thus, by applying the first braking force Br1 to the one of the rear wheels 16L, 16R, the rotation speed Wrl, Wrr of which is higher than that of the other, it is possible to cause the first differential case 114 and the first side gear 122R to be rotated integrally with each other, namely, cause the first movable sleeve 126 and the first side gear 122R to be rotated integrally with each other, so that the first differential torque Ts1 can be advantageously reduced.

Another example of the present invention will then be described in detail with reference to drawings. In the following description, the same parts in the examples are identified with the same reference signs, and the description thereof will be omitted.

Example 2

An electronic control device 250 of the present example differs in that the electronic control device 250 further includes a 4WD control portion 252, a 4WD request determination portion 254 and a 4WD release request determination portion 256, and is substantially the same as the electronic control device 150 described above in other respects. Although the electronic control device 250 also includes the differential lock control portion 220, the differential lock request determination portion 222 and the differential lock release request determination portion 224 which are included in the electronic control device 150 of example 1, in the electronic control device 250 shown in FIG. 17, these portions are omitted.

Figure 17:
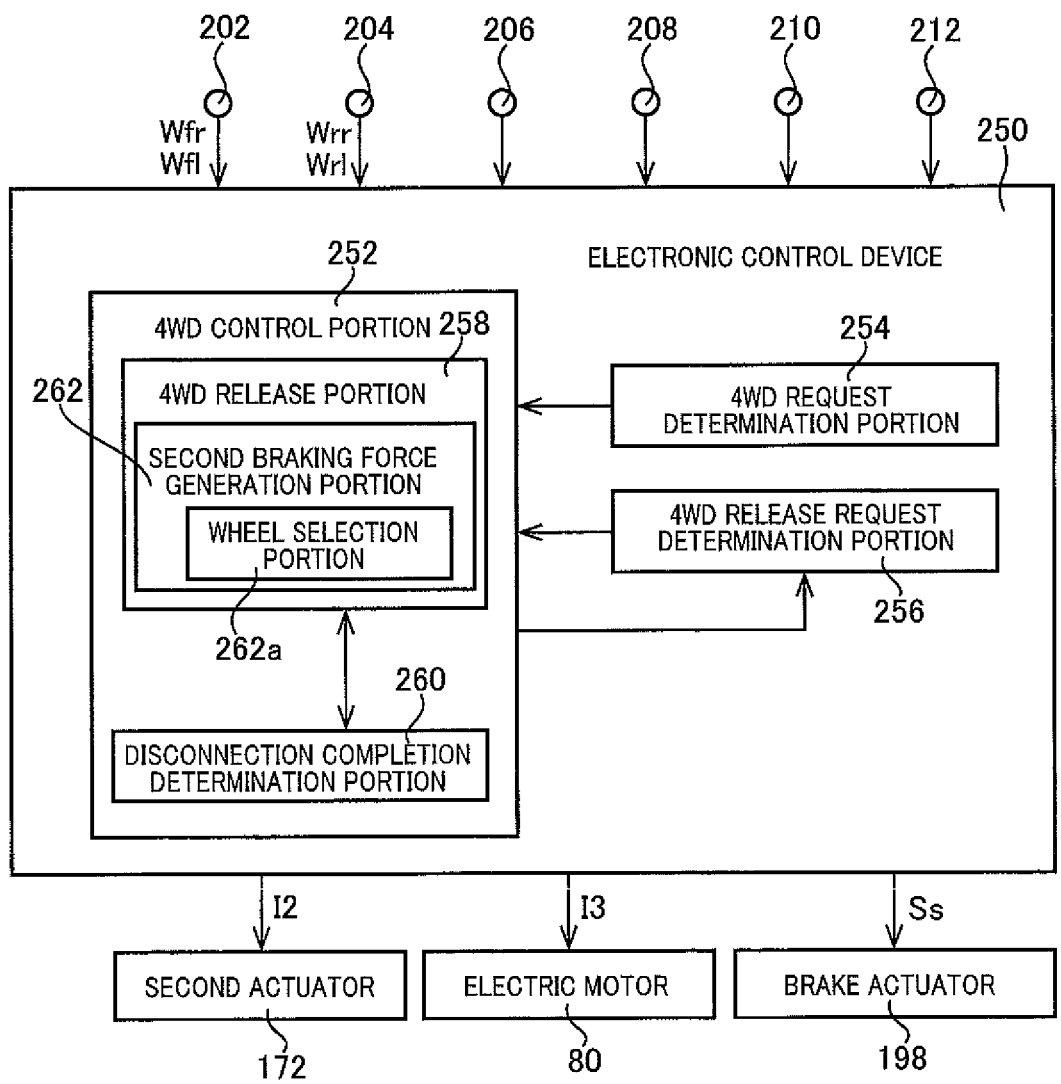
FIG. 17 is a diagram showing another example (example 2) in the present invention, and is a function block diagram illustrating a main part of the control function of an electronic control device which controls switching between four-wheel drive traveling and two-wheel drive traveling.

In order to move the second movable sleeve 164 to the second engagement position or the second nonengagement position, the 4WD control portion 252 shown in FIG. 17 controls the second drive current I2 supplied to the second electromagnetic coil 178 included in the second actuator 172.

The 4WD request determination portion 254 determines whether or not a 4WD request for requesting four-wheel drive traveling is present during vehicle traveling. For example, the 4WD request determination portion 254 determines that the 4WD request is present when a 4WD traveling mode selection switch for selecting a 4WD traveling mode in which the four-wheel drive traveling is executed is operated by the driver.

When the 4WD request determination portion 254 determines that the 4WD request is present, the 4WD control portion 252 controls the third drive current I5 supplied to the electric motor 80 such that the fork shaft 98 is moved to the low gear position, that is, that the center differential lock state in which the rotational differential between the rear propeller shaft 26 and the front propeller shaft 24 in the transfer 22 is restricted is established, and thereafter, the 4WD control portion 252 supplies the second drive current I2 to the second electromagnetic coil 178 included in the second actuator 172. The second drive current I2 is supplied to the second electromagnetic coil 178, and thus the second thrust F2 is applied from the second electromagnets c coil 178 through the magnetic plunger 176 to the second movable sleeve 164, so that the second movable sleeve 164 is moved to the second engagement position against the biasing force of the second disc spring 180. In this way, in the front wheel differential gear device 28, a power transmission path between the second differential case 162 and the pair of second side gears 152L and 152R is connected, and thus the drive power from the engine 12 is individually transmitted to the front wheels 14L, 14R and the rear wheels 16L, 16R.

When the 4WD control portion 252 supplies the second drive current I2 to the second actuator 172, the 4WD release request determination portion 256 determines whether or not a request for releasing the four-wheel drive traveling, that is, a 4WD release request for requesting the two-wheel drive traveling is present. For example, the 4WD release request determination portion 256 determines that the 4WD release request is present when the 4WD traveling mode selection switch which has been operated by the driver is operated again by the driver.

As shown in FIG. 17, the 4WD control portion 252 includes a 4WD release portion 258 and a disconnection completion determination portion 260. When the 4WD release request determination portion 256 determines that the 4WD release request is present, the 4WD release portion 258 stops the supply of the second drive current I2 supplied to the second electromagnetic coil 178 included in the second actuator 172. The second drive current, I2 is stopped from being supplied to the second electromagnetic coil 178, and thus the second movable sleeve 164 is biased by the biasing force of the second disc spring 180 so as to be returned to the second nonengagement position. When the second movable sleeve 164 is moved by the biasing force of the second disc spring 180 from the second engagement position to the second nonengagement position, the engagement of the second input side engagement teeth 164c of the second movable sleeve 164 and the second output side engagement teeth 156b of the pinion support member 156 is released, and thus in the front wheel side differential gear device 28, the connected state in which the power transmission path between the second differential case 154 and the pair of second side gears 152L and 152R is connected, is switched to a disconnected state in which the power transmission path is disconnected.

When the 4WD release portion 258 stops the supply of the second drive current I2 to the second actuator 172, the disconnection completion determination portion 260 determines whether or not the power transmission path between the second differential case 154 and the pair of second side gears 152L and 152R is actually disconnected in the front wheel side differential gear device 28, that is, whether or not the second movable sleeve 164 is located in the second nonengagement position. For example, when the second position sensor 208 detects that the second movable sleeve 164 is located in a position other than the second engagement position, that is, in the second nonengagement position, the disconnection completion determination portion 260 determines that the power transmission path is actually disconnected.

When the disconnection completion determination portion 260 determines that in the front wheel side differential gear device 28, the power transmission path between the second differential case 154 and the pair of second side gears 152L and 152R is actually disconnected, the 4WD release portion 258 controls the third drive current I3 supplied to the electric motor 80 such that the fork shaft 98 is moved from the low gear position to the high gear position, that is, such that the differential state in which the rotational differential between the rear propeller shaft 26 and the front propeller shaft 24 is not restricted in the transfer 22 is established. In this way, the four-wheel drive traveling switched to the two-wheel drive traveling.

As shown in FIG. 17, the 4WD release portion 258 includes a second braking force generation portion 262, and the second braking force generation portion 262 includes a wheel selection portion 262a. When the disconnection completion determination portion 260 determines that a time tb during which the disconnection completion determination portion 260 determines that in the front wheel differential gear device 28, the power transmission path between the second differential case 154 and the pair of second side gears 152L and 152R is not actually disconnected, exceeds a predetermined time tb1, that is, determines that the second differential torque Ts2 is generated in the second coupling device 166 and that due to the second differential torque Ts2, the second movable sleeve 164 cannot be moved from the second engagement position to the second nonengagement position only by the biasing force of the second disc spring 180, the second braking force generation portion 262 applies a second braking force (braking force) Br2 (N) to one of the second movable sleeve 164 and the pinion support member 156 so as to reduce the second differential torque Ts2, that is, to one of the pair of left and right front wheels 14L, 14R and the pair of left and right rear wheels 16L, 16R so as to reduce the second differential torque Ts2.

When the time tb, during which the disconnection completion determination portion 260 determines that in the front wheel side differential gear device 28, the power transmission path between the second differential case 154 and the pair of second side gears 152L and 152R is not actually disconnected, exceeds the predetermined time tb1l, the wheel selection portion 262a selects one of the pair of left and right front wheels 14L, 14R and the pair of left and right rear wheels 16L, 16R to which the second braking force Br2 generated by the second braking force generation portion 262 is to be applied in order to reduce the second differential torque Ts2. For example, when the time tb, during which the disconnection completion determination portion 260 determines that in the front wheel side differential gear device 28, the power transmission path between the second differential case 154 and the pair of second side gears 152L and 152R is not actually disconnected, exceeds the predetermined time tb1, the wheel selection portion 262a selects one of the pair of left and right front wheels 14L, 14R whose average rotation speed Wfav((Wfl+Wfr)/2) (rpm) is detected from the first wheel speed sensor 202 and the pair of left and right rear wheels 16L, 16R whose average rotation speed Wrav((Wrl+Wrr)/2) (rpm) is detected from the second wheel speed sensor 204, such that the average rotation speed of the selected one of the pair of left and right front wheels 14L, 14R and the pair of left and right rear wheels 16L, 16R is higher than the average speed of the other of the pair of left and right front wheels 14L, 14R and the pair of left and right rear wheels 16L, 16R. When the second differential torque Ts2 is generated, for example, the front propeller shaft 24 and the rear propeller shaft 26 are twisted by the second differential torque Ts2, and, for example, by a change in twisting caused by restoring the twisting of one of the front propeller shaft 24 and the rear propeller shaft 26, the higher rotation side of the pair of left and right front wheels 14L,14R and the pair of left and right rear wheels 16L, 16R slips, so that a rotational difference s caused between the average rotation speed Wfav of the pair of left and right front wheels 14L, 14R and the average rotation speed Wrav of the pair of left and right rear wheels 16L, 16R.

When the wheel selection portion 262a selects the pair of left and right wheels to which the second braking force Br2 is to be applied, the second braking force generation portion 262 supplies the command current Ss to the solenoid valve 200 of the brake actuator 198 such that the brake hydraulic pressure of the pair of calipers 196 provided in the selected pair of left and right wheels is increased so as to apply the second braking force Br2 to the selected pair of left and right wheels. In the second braking force generation portion 262, the second braking force Br2 is generated for a predetermined time to which is previously set, and the magnitude of the second braking force Br2 and the predetermined time to during which the second braking force Br2 is to be generated are set such that the driver does not sense deceleration during vehicle traveling. In the second braking force generation portion 262, the second braking force Br2 is applied to the pair of left and right wheels which is selected in the wheel selection portion 62a and whose average rotation speed Wfav, Wrav is higher, that is, in the pair of left and right wheels coupled to the propeller shaft 24, 26 of one of the pair of left and right front wheels 14L, 14R and the pair of left and right rear wheels 16L, 16R which remains twisted by the second differential torque Ts2 without yet restoring the original shape, and thus the twisting of the front propeller shaft 24 and the rear propeller shaft 28 is suitably decreased, and the second differential torque Ts2 is reduced, so that the second movable sleeve 164 and the pinion support member 156 are rotated together.

Figure 18:
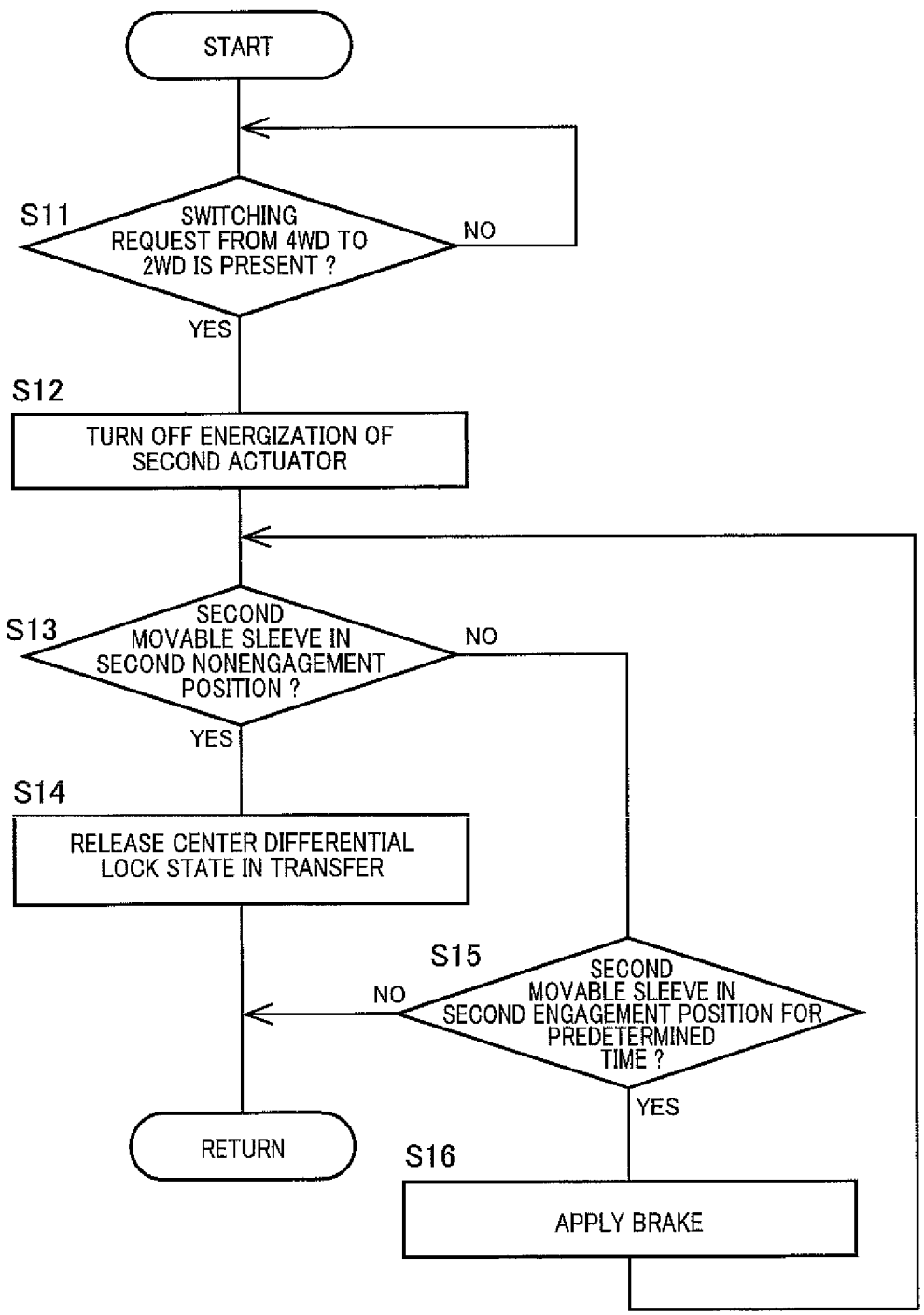
FIG. 18 is a flowchart illustrating an example of an operation in which, in the electronic control device of FIG. 17, the four-wheel drive traveling is switched to two-wheel drive traveling.

FIG. 18 is a flowchart illustrating an example of an operation in which, in the electronic control device 250, for example, during four-wheel drive traveling, the four-wheel drive traveling is switched to two-wheel drive traveling.

First, in S11 corresponding to the function of the 4WD release request determination portion 256, whether or not a request for canceling the four-wheel drive traveling, that is, a switching request for switching from the four-wheel drive traveling to the two-wheel drive traveling is present is determined. When the determination of S11 is no, S11 is executed again. When the determination of S11 is yes, S12 corresponding to the function of the 4WD release portion 258 is executed. In S12, the supply, of the second drive current I2 to the second electromagnetic coil 178 included in the second actuator 172 is stopped, that is, the energization of the second actuator 172 is turned off.

Next, in S13 corresponding to the function of the disconnection completion determination portion 260, whether or not the power transmission path between the second differential case 154 and the pair of second side gears 152L, 152R in the front wheel side differential gear device 28 is actually disconnected, that is, whether or not the second movable sleeve 164 is positioned in the second nonengagement position determined. When the determination of S13 is yes, S14 corresponding to the function of the 4WD release portion 258 is executed. When the determination of S13 is no, S15 corresponding to the function of the second braking force generation portion 262 is executed. In S14, the third drive current I3 supplied to the electric motor 80 is controlled such that the differential state in which the rotational differential between the rear propeller shaft 26 and the front propeller shaft 24 is not restricted in the transfer 22 is established, that the center differential lock state is released in the transfer 22. In S15, whether or not the second movable sleeve 164 is positioned in the second engagement position for the predetermined time tb1 after the stop of the supply of the second drive current I2 in S12, is determined. When the determination of S15 is no, the present routine is completed whereas when the determination of S15 is yes, S16 corresponding to the function of the second braking force generation portion 262 is executed. In S16, a break is applied such that the second braking force Br2 is generated in one of the pair of left and right front wheels 14L, 14R and the pair of left and right rear wheels 16L, 16R whose average rotation speed Wfav, Wrav is higher.

In the present example, when it is determined in S11 that the request for releasing the four-wheel drive traveling is present, and it is determined in S15 that after the supply of the second drive current I2 is stopped in S12, the second movable sleeve 164 is not moved to the second nonengagement position for the predetermined time tb1, that is, it is determined that the second differential torque Ts2 is generated, in S16, the second braking force Br2 is generated in one of the pair of left and right front wheels 14L, 14R and the pair of left and right rear wheels 16L, 16R so as to reduce the second differential torque Ts2, so that a time until the four-wheel drive traveling is switched to the two-wheel drive traveling is advantageously reduced.

As described above, in the four-wheel drive vehicle 10 of the present example, when the coupled state be released in the second engagement clutch mechanism 168, namely, when the engagement of the second movable sleeve 164 and the pinion support member 156 156 is to be released, the second braking force Br2 is applied to one of the pair of left and right front wheels 14L, 14R and the pair of left and right rear wheels 16L, 16R, such that the second differential torque Ts2 is reduced. Thus, when the engagement of the second movable sleeve 164 and the pinion support member 156 156 is to be released, the second differential torque Ts2 is reduced by the application of the second braking force Br2. Owing to this arrangement, it is possible to advantageously reduce the time required to release the engagement of the second movable sleeve 164 and the pinion support member 156 156, thereby eliminating needs of increase of the biasing force of the second disc spring 180 and increase of a size of the second actuator 172, for example, which have been required conventionally. Therefore, it is possible to advantageously reduce the time required to release the coupled state in the second engagement clutch mechanism 168, namely, to release the engagement of the second movable sleeve 164 and the pinion support member 156 156, while suppressing increases in the size and mass of the second coupling device 166.

In the four-wheel drive vehicle 10 of the present example, the front wheel differential gear device 28 includes the second differential case 154 which stores the pair of second side gears 152L, 152R and which is supported to be rotatable about the fifth rotation axis line C5, the second pinions 160a,160b engaging with the pair of second side gears 152L, 152R, and the annular pinion support member 156 which is stored within the second differential case 154 and is rotatable about the fifth rotation axis line C5 relative to the second differential case 154, the annular pinion support member 156 supporting the second pinions 160a,160b through the second pinion shaft 158, such that the second pinions 160a, 160b are rotatable. The second movable sleeve 164 is supported by the second differential case 154, such that the second movable member 164 is substantially unrotatable about the fifth rotation axis line C5 relative to the second differential case 154, and is movable in the direction of the fifth rotation axis line C5 relative to the second differential case 154. The pinion support member 156 is provided in the front wheel differential gear device 28. The second engagement clutch mechanism 168 includes: the second output side engagement teeth 156b which are formed in one of axially opposite end surfaces of the annular pinion support member 156, which one is closer to the second movable sleeve 164 than the other of the axially opposite end surfaces; the second input side engagement teeth 164c which are formed in the second movable sleeve 164 and are to engage with the second output side engagement teeth 156b; and the second actuator 172 which is configured to move the second movable sleeve 164 to a second engagement position in which the second input side engagement teeth 164c engage with the second output side engagement teeth 156b or a second nonengagement position in which the second input side engagement teeth 164c do not engage with the second output side engagement teeth 156b. When the second movable sleeve 164 is moved to the second engagement position by the second actuator 172, the second differential case 154 and the annular pinion support member 156 are coupled to each other. When the second movable sleeve 164 is moved by the second actuator 172 from the second engagement position to the second nonengagement position, the coupling of the second differential case 154 and the annular pinion support member 156 is released. Owing to the above arrangement, it is possible to advantageously reduce the time required to switch from the connected state of the front wheel differential gear device 28 in which a power transmission path between the second differential case 154 and the pair of second side gears 152L, 152R is connected, to a disconnected state of the front wheel differential gear device 28 in which the power transmission path is disconnected, while suppressing increase in the size of the second actuator 172.

In the four-wheel drive vehicle 10 of the present example, the second cam mechanism 170 includes the second case side cam surfaces 154f and the second sleeve side cam surfaces 164e provided on the opposed surfaces of the second differential case 154 and the second movable sleeve 164 (that is substantially unrotatable about relative to the second differential case 154), which are opposed to each other in the circumferential direction about the fifth rotation axis line C5, such that the second movable sleeve 164 is pressed against the end surface 156a (i.e., the one of the axially opposite end surfaces) of the pinion support member 156, by the pressing force that is increased depending on the second differential torque Ts2. Thus, the pressing force is reduced with the second differential torque Ts2 being reduced by application of the second braking force Br2, so that it is possible to advantageously reduce a force required by the second actuator 172 to move the second movable sleeve 164 from the second engagement position to the second nonengagement position.

In the four-wheel drive vehicle 10 of the present example, the second actuator 172 includes the second disc spring 180 which constantly forces the second movable sleeve 164 in a direction toward second nonengagement position away from the second engagement position. The second actuator 172 is configured to move the second movable sleeve 164 to the second engagement position against the biasing force of the second disc spring 180, and moves the second movable sleeve 164 to the second nonengagement position by the biasing force of the second disc spring 180. Thus, owing to the reduction of the pressing force by the reduction of the second differential torque Ts2, it is possible to reduce the biasing force of the second disc spring 180 and accordingly to advantageously reduce the size of the second actuator 172.

In the four-wheel drive vehicle 10 of the present example, the pair of left and right front wheels 14L, 14R are coupled to the pair of second side gears 152L, 152R in a power transmittable manner, while the pair of left and right rear wheels 16L, 16R are coupled to the second differential case 154 through the rear wheel differential gear device 30 in a power transmittable manner. When the second movable sleeve 164 is to be moved by the second actuator 172 from the second engagement position to the second nonengagement position so as to release the coupling of the second differential case 154 and the pinion support member 156, the control device 250 is configured to cause the second braking force Br2 to be applied to one of the pair of left and right front wheels 14L, 14R and the pair of left and right rear wheels 16L, 16R, wherein the average rotation speed Wfav, Wrav of the one of the pair of left and right front wheels 14L, 14R and the pair of left and right rear wheels 16L, 16R is higher than the average rotation speed Wfav, Wrav of the other of the pair of left and right front wheels 14L, 14R and the pair of left and right rear wheels 16L, 16R. Thus, by applying the second braking force Br2 to the one of the pair of left and right front wheels 141L, 14R and the pair of left and right rear wheels 16L, 16R, the average rotation speed Wfav, Wrav of which is higher than the average rotation speed Wfav, Wrav of the other, it is possible to cause the second differential case 154 and the pinion support member 156 to be rotated integrally with each other, namely, cause the second movable sleeve 164 and the pinion support member 156 to be rotated integrally with each other, so that the second differential torque Ts2 can be advantageously reduced.

Although the examples of the present invention are described in detail above with reference to the drawings, the present invention is also applied to other aspects of the present invention.

For example, in example 1 described above, when the engagement of the first movable sleeve 126 and the first side gear 122R is to be released from the coupled state in which in the rear wheel side differential gear device 30, the first movable sleeve 126 of the first engagement clutch mechanism 130 and the first side gear 122R are coupled together, the calipers 196 generate the first braking force Br1 in one of the rear wheel 16L and the rear wheel 16R, and thus the first differential torque Ts1 is reduced. However, for example, a braking force generation device may be provided to apply the first braking force Br1 to a first member which is coupled to the first movable sleeve 126 in a power transmittable manner or a second member which is coupled to the first side gear 122R in a power transmittable manner, and when the engagement of the first movable sleeve 126 and the first side gear 122R is to be released from the coupled state, the first braking force Br1 is applied to one of the first movable sleeve 126 and the first side gear 122R by braking force generation device, such that the first differential torque Ts1 is reduced.

In example 2 described above, when the engagement of the second movable sleeve 164 and the pinion support member 156 is to be released from the coupled state in which in the front wheel side differential gear device 28, the second movable sleeve 164 and the pinion support member 156 in the second engagement clutch mechanism 168 are coupled together, the calipers 196 generate the second braking force Br2 in one of the pair of left and right front wheels 14L, 14R and the pair of left and right rear wheels 16L, 16R so as to reduce the second differential torque Ts2. However, for example, a braking force generation device may be provided to apply the second braking force Br2 to a first member which is coupled to the second movable sleeve 164 in a power transmittable manner or a second member which is coupled to the pinion support member 156 in a power transmittable manner, and when the engagement of the second movable sleeve 164 and the pinion support member 156 is to be released from the coupled state, the second braking force Br2 is applied to one of the second movable sleeve 164 and the pinion support member 156 by the braking force generation device, such that the second differential torque Ts2 is reduced.

Although in the examples described above, the first disc spring 142 is provided in the first actuator 134, for example, the first disc spring 142 does not always need to be provided in the first actuator 134. In other words, by the first actuator 134 in which the first disc spring 142 is not provided, the first movable sleeve 126 may be selectively moved to the first engagement position or the first nonengagement position. Although in the examples described above, the second disc spring 180 is provided in the second actuator 172, for example, the second disc spring 180 does not always need to be provided in the second actuator 172. In other words, by the second actuator 172 in which the second disc spring 180 is not provided, the second movable sleeve 164 may be selectively moved to the second engagement position or the second nonengagement position.

Although in example 1 described above, whether or not the differential lock request or the differential lock release request is present is determined depending on the manual operation of the differential lock traveling mode selection switch 212 by the driver, for example, whether or not the differential lock request or the differential lock release request is present may be automatically determined by the electronic control device 150, depending on the state of traveling of the vehicle. Although in example 2 described above, whether or not the 4WD request or the 4WD release request is present is determined depending on the manual operation of the 4WD traveling mode selection switch by the driver, for example, whether or not the 4WD request or the 4WD release request is present may be automatically determined by the electronic control device 250 depending on the state of vehicle traveling.

What has been described above is only an embodiment, and the present invention can be practiced based on the knowledge of a person skilled in the art in various aspects to which various modifications or improvements are added.

NOMENCLATURE OF ELEMENTS

10: four-wheel drive vehicle (vehicle)
12: engine (drive power source)
14L,14R: front wheels (front wheel side drive wheels)
16L: rear wheel (left drive wheel) (rear wheel side drive wheel)
16R: rear wheel (right drive heel) (rear wheel side drive wheel)
28: front wheel differential gear device (second differential device)
30: rear wheel differential gear device (first differential device)

114: first differential case
114g: first case side cam surface (cam surface)
122L: first side gear
122R: first side gear(output side engagement member)
122Ra: back surface
122Rb: first output side engagement teeth
126: first movable sleeve (input side engagement member)
126c: first input side engagement teeth
126e: first sleeve side cam surface(cam surface)
128: first coupling device (coupling device)
130: first engagement clutch mechanism(engagement clutch mechanism)
132: first cam mechanism (cam mechanism)
134: first actuator
142: first disc spring (first return spring)
150: electronic control device (control device)
152L,152R: second side gears
154: second differential case
154f: second case side cam surface (cam surface)
156: pinion support member (output side engagement member)
156a: end surface
156b: second output side engagement teeth
158: second pinion shaft
160a,160b: second pinions
164: second movable sleeve (input side engagement member)
164c: second input side engagement teeth
164e: second sleeve side cam surface (cam surface)
166: second coupling device (coupling device)
168: second engagement clutch mechanism (engagement clutch mechanism)
170: second cam mechanism (cam mechanism)
172: second actuator
180: second disc spring (second return spring)
250: electronic control device (control device)
224: differential lock release request determination portion
226: differential lock release portion
230: first braking force generation portion
230a: wheel selection portion
256: 4WD release request determination portion
258: 4WD release portion
262: second braking force generation portion
262a: wheel selection portion
Br1: first braking force (braking force)
Br2: second braking force(braking force)
C4: fourth rotation axis line (first rotation axis line)
C5: fifth rotation axis line (second rotation axis line)
Ts1: first differential torque (differential torque)
Ts2: second differential torque (differential torque)
Wrl,Wrr: rotation speeds
Wfav,Wrav: average rotation speeds

What is claimed is:

1. A vehicle, comprising:
a coupling device, wherein the coupling device comprises:
an engagement clutch mechanism configured to couple an input side engagement member that is coupled to a drive power source of the vehicle in a power transmittable manner and an output side engagement member that is coupled to a drive wheel of the vehicle in a power transmittable manner such that the input side engagement member and the output side engagement member engage with each other; and
a cam mechanism configured to assist the engagement of the input side engagement member and the output side engagement member, depending on a differential torque by which the input side engagement member and the output side engagement member are rotated differentially in a coupled state in which the input side engagement member and the output side engagement member are coupled to each other in the engagement clutch mechanism; and
a control device configured, when a request for releasing the engagement of the input side engagement member and the output side engagement member is present and when a time during which the engagement of the input side engagement member and the output side engagement member has not been released since the request for releasing the engagement of the input side engagement member and the output side engagement member exceeds a predetermined time, to cause a braking force to be applied to one of the input side engagement member and the output side engagement member such that the differential torque is reduced.

2. The vehicle according to claim 1, comprising a first differential device including a first differential case which is supported to be rotatable about a first rotation axis line,
wherein the input side engagement member is a first movable sleeve which is supported by the first differential case, such that the first movable sleeve is substantially unrotatable about the first rotation axis relative to the first differential case, and is movable in a direction of the first rotation axis line relative to the first differential case,
the output side engagement member is one of a pair of first side gears which are held in the first differential case and are rotatable about the first rotation axis line,
the engagement clutch mechanism includes:
first output side engagement teeth which are formed in a back surface of the one of the pair of first side gears;
first input side engagement teeth which are formed in the first movable sleeve and are to engage with the first output side engagement teeth; and
a first actuator which is configured to move the first movable sleeve to a first engagement position in which the first input side engagement teeth engage with the first output side engagement teeth or a first nonengagement position in which the first input side engagement teeth do not engage with the first output side engagement teeth,
when the first movable sleeve is moved to the first engagement position by the first actuator, the first differential case and the one of the pair of first side gears are coupled to each other, and
when the first movable sleeve is moved by the first actuator from the first engagement position to the first nonengagement position, a coupling of the first differential case and the one of the pair of first side gears is released.

3. The vehicle according to claim 2,
wherein the cam mechanism includes cam surfaces provided on opposed surfaces of the first differential case and the first movable sleeve, which are opposed to each other in a circumferential direction about the first rotation axis line, such that the first movable sleeve is pressed against the back surface of the one of the first side gears, by a pressing force that is increased depending on the differential torque.

4. The vehicle according to claim 2,
wherein the first actuator includes a first return spring which constantly forces the first movable sleeve in a direction toward the first nonengagement position away from the first engagement position, and the first actuator is configured to move the first movable sleeve to the first engagement position against a biasing force of the first return spring, and moves the first movable sleeve to the first nonengagement position by the biasing force of the first return spring.

5. The vehicle according to claim 2, wherein a left side drive wheel and a right side drive wheel of the vehicle are coupled to the pair of first side gears in a power transmittable manner, and when the first movable sleeve is to be moved by the first actuator from the first engagement position to the first nonengagement position so as to release the coupling of the first differential case and the one of the pair of first side gears, the control device is configured to cause the braking force to be applied to one of the left side drive wheel and the right side drive wheel, a rotation speed of the one of the left side drive wheel and the right side drive wheel being higher than a rotation speed of the other of the left side drive wheel and the right side drive wheel.

6. The vehicle according to claim 1, comprising:

a second differential device including:

a second differential case which stores a pair of second side gears and which is supported to be rotatable about a second rotation axis line;

a second pinion engaging with the pair of second side gears; and an annular pinion support member which is stored within the second differential case and is rotatable about the second rotation axis line relative to the second differential case, the annular pinion support member supporting the second pinion through a second pinion shaft, such that the second pinion is rotatable, wherein the input side engagement member is a second movable sleeve which is supported by the second differential case, such that the second movable member is substantially unrotatable about the second rotation axis relative to the second differential case, and which is movable in a direction of the second rotation axis line relative to the second differential case, the output side engagement member is the annular pinion support member which is provided in the second differential device, the engagement clutch mechanism includes:

second output side engagement teeth which are formed in one of axially opposite end surfaces of the annular pinion support member, the one of the axially opposite end surfaces being closer to the second movable sleeve than the other of the axially opposite end surfaces;

second input side engagement teeth which are formed in the second movable sleeve and are to engage with the second output side engagement teeth; and a second actuator which is configured to move the second movable sleeve to a second engagement position in which the second input side engagement teeth engage with the second output side engagement teeth or a second nonengagement position in which the second input side engagement teeth do not engage with the second output side engagement teeth, when the second movable sleeve is moved to the second engagement position by the second actuator, the second differential case and the annular pinion support member are coupled to each other, and when the second movable sleeve is moved by the second actuator from the second engagement position to the second nonengagement position, a coupling of the second differential case and the annular pinion support member is released.

7. The vehicle according to claim 6, wherein the cam mechanism includes cam surfaces provided on opposed surfaces of the second differential case and the second movable sleeve, which are opposed to each other in a circumferential direction about the second rotation axis line, such that the second movable sleeve is pressed against the one of the axially opposite end surfaces of the annular pinion support member, by a pressing force that is increased depending on the differential torque.

8. The vehicle according to claim 6, wherein the second actuator includes a second return spring which constantly forces the second movable sleeve in a direction toward the second nonengagement position away from the second engagement position, and the second actuator is configured to move the second movable sleeve to the second engagement position against a biasing force of the second return spring, and moves the second movable sleeve to the second nonengagement position by the biasing force of the second return spring.

9. The vehicle according to claim 6, wherein a pair of left and right front wheel side drive wheels of the vehicle are coupled to the pair of second side gears in a power transmittable manner, a pair of left and right rear wheel side drive wheels of the vehicle are coupled to the second differential case through a differential device in a power transmittable manner, and when the second movable sleeve is to be moved by the second actuator from the second engagement position to the second nonengagement position so as to release the coupling of the second differential case and the pinion support member, the control device is configured to cause the braking force to be applied to one of the pair of left and right front wheel side drive wheels and the pair of left and right rear wheel side drive wheels, an average rotation speed of the one of the pair of left and right front wheel side drive wheels and the pair of left and right rear wheel side drive wheels is higher than an average rotation speed of the other of the pair of left and right front wheel side drive wheels and the pair of left and right rear wheel side drive wheels.

10. A vehicle, comprising:

a coupling device, wherein the coupling device comprises:

an engagement clutch mechanism configured to couple an input side engagement member that is coupled to a drive power source of the vehicle in a power transmittable manner and an output side engagement member that is coupled to a drive wheel of the vehicle in a power transmittable manner such that the input side engagement member and the output side engagement member engage with each other; and a cam mechanism configured to assist the engagement of the input side engagement member and the output side engagement member, depending on a differential torque by which the input side engagement member and the output side engagement member are rotated differentially in a coupled state in which the input side engagement member and the output side engagement member are coupled to each other in the engagement clutch mechanism;

a control device configured, when the engagement of the input side engagement member and the output side engagement member is to be released, to cause a braking force to be applied to one of the input side engagement member and the output side engagement member such that the differential torque is reduced; and a first differential device including a first differential case which is supported to be rotatable about a first rotation axis line, wherein:

the input side engagement member is a first movable sleeve which is supported by the first differential case, such that the first movable sleeve is substantially unrotatable about the first rotation axis relative to the first differential case, and is movable in a direction of the first rotation axis line relative to the first differential case, the output side engagement member is one of a pair of first side gears which are held in the first differential case and are rotatable about the first rotation axis line, the engagement clutch mechanism includes:
 first output side engagement teeth which are formed in a back surface of the one of the pair of first side gears;
 first input side engagement teeth which are formed in the first movable sleeve and are to engage with the first output side engagement teeth; and
 a first actuator which is configured to move the first movable sleeve to a first engagement position in which the first input side engagement teeth engage with the first output side engagement teeth or a first nonengagement position in which the first input side engagement teeth do not engage with the first output side engagement teeth, when the first movable sleeve is moved to the first engagement position by the first actuator, the first differential case and the one of the pair of first side gears are coupled to each other, when the first movable sleeve is moved by the first actuator from the first engagement position to the first nonengagement position, a coupling of the first differential case and the one of the pair of first side gears is released, a left side drive wheel and a right side drive wheel of the vehicle are coupled to the pair of first side gears in a power transmittable manner, and when the first movable sleeve is to be moved by the first actuator from the first engagement position to the first nonengagement position so as to release the coupling of the first differential case and the one of the pair of first side gears, the control device is configured to cause the braking force to be applied to one of the left side drive wheel and the right side drive wheel, a rotation speed of the one of the left side drive wheel and the right side drive wheel being higher than a rotation speed of the other of the left side drive wheel and the right side drive wheel.

11. The vehicle according to claim 10,
wherein the cam mechanism includes cam surfaces provided on opposed surfaces of the first differential case and the first movable sleeve, which are opposed to each other in a circumferential direction about the first rotation axis line, such that the first movable sleeve is pressed against the back surface of the one of the first side gears, by a pressing force that is increased depending on the differential torque.

12. The vehicle according to claim 10,
wherein the first actuator includes a first return spring which constantly forces the first movable sleeve in a direction toward the first nonengagement position away from the first engagement position, and
the first actuator is configured to move the first movable sleeve to the first engagement position against a biasing force of the first return spring, and moves the first movable sleeve to the first nonengagement position by the biasing force of the first return spring.

13. A vehicle, comprising:
a coupling device, wherein the coupling device comprises:
 an engagement clutch mechanism configured to couple an input side engagement member that is coupled to a drive power source of the vehicle in a power transmittable manner and an output side engagement member that is coupled to a drive wheel of the vehicle in a power transmittable manner such that the input side engagement member and the output side engagement member engage with each other; and
 a cam mechanism configured to assist the engagement of the input side engagement member and the output side engagement member, depending on a differential torque by which the input side engagement member and the output side engagement member are rotated differentially in a coupled state in which the input side engagement member and the output side engagement member are coupled to each other in the engagement clutch mechanism;
a control device configured, when the engagement of the input side engagement member and the output side engagement member is to be released, to cause a braking force to be applied to one of the input side engagement member and the output side engagement member such that the differential torque is reduced; and
a differential device including:
 a differential case which stores a pair of side gears and which is supported to be rotatable about a rotation axis line;
 a pinion engaging with the pair of side gears; and
 an annular pinion support member which is stored within the differential case and is rotatable about the rotation axis line relative to the differential case, the annular pinion support member supporting the pinion through a pinion shaft, such that the pinion is rotatable, wherein:
the input side engagement member is a movable sleeve which is supported by the differential case, such that the movable member is substantially unrotatable about the rotation axis relative to the differential case, and which is movable in a direction of the rotation axis line relative to the differential case,
the output side engagement member is the annular pinion support member which is provided in the differential device,
the engagement clutch mechanism includes:
 output side engagement teeth which are formed in one of axially opposite end surfaces of the annular pinion support member, the one of the axially opposite end surfaces being closer to the movable sleeve than the other of the axially opposite end surfaces;
 input side engagement teeth which are formed in the movable sleeve and are to engage with the output side engagement teeth; and an actuator which is configured to move the movable sleeve to an engagement position in which the input side engagement teeth engage with the output side engagement teeth or a nonengagement position in which the input side engagement teeth do not engage with the output side engagement teeth, when the movable sleeve is moved to the engagement position by the actuator, the differential case and the annular pinion support member are coupled to each other, when the movable sleeve is moved by the actuator from the engagement position to the nonengagement position, a coupling of the differential case and the annular pinion support member is released, a pair of left and right front wheel side drive wheels of the vehicle are coupled to the pair of side gears in a power transmittable manner, a pair of left and right rear wheel side drive wheels of the vehicle are coupled to the differential case through a differential device in a power transmittable manner, and when the movable sleeve is to be moved by the actuator from the engagement position to the nonengagement position so as to release the coupling of the differential case and the pinion support member, the control device is configured to cause the braking force to be applied to one of the pair of left and right front wheel side drive wheels and the pair of left and right rear wheel side drive wheels, an average rotation speed of the one of the pair of left and right front wheel side drive wheels and the pair of left and right rear wheel side drive wheels is higher than an average rotation speed of the other of the pair of left and right front wheel side drive wheels and the pair of left and right rear wheel side drive wheels.

14. The vehicle according to claim 13,
wherein the cam mechanism includes cam surfaces provided on opposed surfaces of the differential case and the movable sleeve, which are opposed to each other in a circumferential direction about the rotation axis line, such that the movable sleeve is pressed against the one of the axially opposite end surfaces of the annular pinion support member, by a pressing force that is increased depending on the differential torque.

15. The vehicle according to claim 13,
wherein the actuator includes a return spring which constantly forces the movable sleeve in a direction toward the nonengagement position away from the engagement position, and the actuator is configured to move the movable sleeve to the engagement position against a biasing force of the return spring, and moves the movable sleeve to the nonengagement position by the biasing force of the return spring.

* * * * *